US012458517B1

United States Patent
Helmer

(10) Patent No.: US 12,458,517 B1
(45) Date of Patent: Nov. 4, 2025

(54) TAPERED JUGULAR STENTS FOR VASCULAR INTERVENTIONS, AND SYSTEMS AND DEVICES THEREOF

(71) Applicant: Neurovenous Technologies, LLC, Honolulu, HI (US)

(72) Inventor: Calvin Helmer, Minneapolis, MN (US)

(73) Assignee: Neurovenous Technologies, LLC, Honolulu, HI (US)

( * ) Notice: Subject to any disclaimer, the term of this patent is extended or adjusted under 35 U.S.C. 154(b) by 0 days.

(21) Appl. No.: 18/920,818

(22) Filed: Oct. 18, 2024

Related U.S. Application Data

(60) Provisional application No. 63/643,199, filed on May 6, 2024.

(51) Int. Cl.
*A61F 2/915* (2013.01)
*A61F 2/88* (2006.01)

(52) U.S. Cl.
CPC .............. *A61F 2/915* (2013.01); *A61F 2/88* (2013.01); *A61F 2002/91525* (2013.01); *A61F 2002/9155* (2013.01); *A61F 2002/91575* (2013.01); *A61F 2210/0014* (2013.01); *A61F 2220/0008* (2013.01); *A61F 2220/0025* (2013.01); *A61F 2230/0063* (2013.01); *A61F 2230/0091* (2013.01); *A61F 2250/0018* (2013.01); *A61F 2250/0037* (2013.01); *A61F 2250/0039* (2013.01)

(58) Field of Classification Search
CPC ........ A61F 2/82–945; A61F 2250/0018; A61F 2250/0029; A61F 2250/0039; A61F 2230/0091
See application file for complete search history.

(56) References Cited

U.S. PATENT DOCUMENTS

| | | | | |
|---|---|---|---|---|
| 7,112,216 B2* | 9/2006 | Gregorich | ............... | A61F 2/915 623/1.15 |
| 2007/0129785 A1* | 6/2007 | Vreeman | ................. | A61F 2/962 623/1.11 |
| 2010/0094391 A1* | 4/2010 | Heraty | ...................... | A61F 2/91 623/1.11 |
| 2012/0116496 A1* | 5/2012 | Chuter | .................. | A61F 2/2412 623/1.15 |
| 2015/0265438 A1* | 9/2015 | Hossainy | .............. | A61L 31/041 623/1.11 |
| 2019/0388254 A1* | 12/2019 | Krieger | .................... | A61F 2/844 |
| 2024/0268976 A1* | 8/2024 | Amans | ...................... | A61F 2/90 |

OTHER PUBLICATIONS

International Search Report and Written Opinion for International Patent Application No. PCT/US2025/027742 dated Jun. 5, 2025, 13 pages.

* cited by examiner

*Primary Examiner* — Rebecca S Preston
(74) *Attorney, Agent, or Firm* — COOLEY LLP

(57) ABSTRACT

Embodiments described herein relate to a stent for vascular interventions. The stent may be used for jugular vein interventions. The stent addresses challenges inherent to the jugular vein by incorporating adaptability, sizing versatility, and a self-expanding mechanism. In some embodiments, the stent may include Nitinol for biocompatibility. In some embodiments, the stent includes a tapered body and may be configured to have a diameter corresponding to a diameter of a jugular vein of a patient. In some embodiments, the stent may include open-cell and/or closed-cell geometries. In some embodiments, the stent may include peak-to-valley (PTV) and helical bridge connections between cells.

27 Claims, 13 Drawing Sheets

DETAIL A

DETAIL B

DETAIL C

DETAIL D

TAPERED JUGULAR STENTS FOR VASCULAR INTERVENTIONS, AND SYSTEMS AND DEVICES THEREOF

CROSS-REFERENCE TO RELATED APPLICATIONS

This application claims priority to U.S. Provisional Patent Application No. 63/643,199, filed May 6, 2024, titled "TAPERED JUGULAR STENTS FOR VASCULAR INTERVENTIONS, AND SYSTEMS AND DEVICES THEREOF," the disclosure of which is incorporated by reference herein.

TECHNICAL FIELD

Embodiments described herein relate to stents for jugular vein interventions. Embodiments described herein relate to stents for treating jugular vein stenosis and/or jugular vein compression.

BACKGROUND

The rising prevalence of jugular vein interventions for various medical conditions has revealed the limitations of existing stents. Existing stents lack adaptability to the diverse anatomies of patients, which often result in suboptimal patient outcomes. In particular, progress in jugular vein interventions has been hindered by the limitations of fixed-size cylindrical stents. Currently, when doing jugular vein interventions, physicians use multiple cylindrical stents telescoped (i.e., concentrically overlapping within one another) inside the jugular vein to achieve the desired outcome. This technique has multiple drawbacks including limited versatility of use, and more importantly, patient safety, emphasizing the need for systems, devices, and methods for jugular vein interventions that can accommodate varying anatomies and procedural requirements.

SUMMARY

In some embodiments, a stent can include an elongate body configured to be disposed in a vessel of a patient, the elongate body defining a lumen configured to allow blood to flow therethrough. The elongate body can include a proximal end portion configured to expand against a wall of the vessel and having a first rigidity sufficient to anchor the proximal end portion against the wall of the vessel; a distal end portion having a second rigidity lower than the first rigidity; and a central portion extending from the proximal end portion to the distal end portion. The central portion can be configured to taper from the proximal end portion to the distal end portion.

In some embodiments, a stent includes an elongate body configured to be disposed in an internal jugular vein (IJV) of a patient, the elongate body defining a lumen configured to allow blood to flow therethrough. The elongate body can be configured to expand from a first configuration to a second configuration. The elongate body when disposed in the IJV and in the second configuration including a proximal end portion positioned near a jugular valve of the patient, the proximal end portion having a first length and a first diameter configured to anchor the proximal end portion against the wall of the IJV; a distal end portion positioned to vertically aligned with a portion of a C1 vertebra, the distal end portion having a second diameter smaller than the first diameter and a second length less than the first length; and a central portion extending from the proximal end portion to the distal end portion, the central portion configured to taper from the first diameter to the second diameter over a third length.

In some embodiments, the stent may include an elongate body configured to be disposed in a vessel of a patient, the elongate body defining a lumen configured to allow blood to flow therethrough, the elongate body including a proximal end portion including a first set of annular structures and a first set of connection members, each annular structure of the first set of annular structures including a plurality of struts and being coupled to adjacent annular structures by one or more connection members of the first set of connection members, and adjacent annular structures of the first set of annular structures being disposable at a first range of peak-to-peak distances from each other. A distal end portion including a second set of annular structures and a second set of connection members, each annular structure of the second set of annular structures including a plurality of struts being coupled to adjacent annular structures by one or more connection members of the second set of connection members, and adjacent annular structures of the second set of annular structures being disposable at a second range of peak-to-peak distances from each other. An average of the first range of peak-to-peak distances being larger than an average of the second range of peak-to-peak distances, a thickness of the plurality of struts of the first set of annular structures being greater than a thickness of the plurality of struts of the second set of annular structures.

DETAILED DESCRIPTION

Figure 1A:
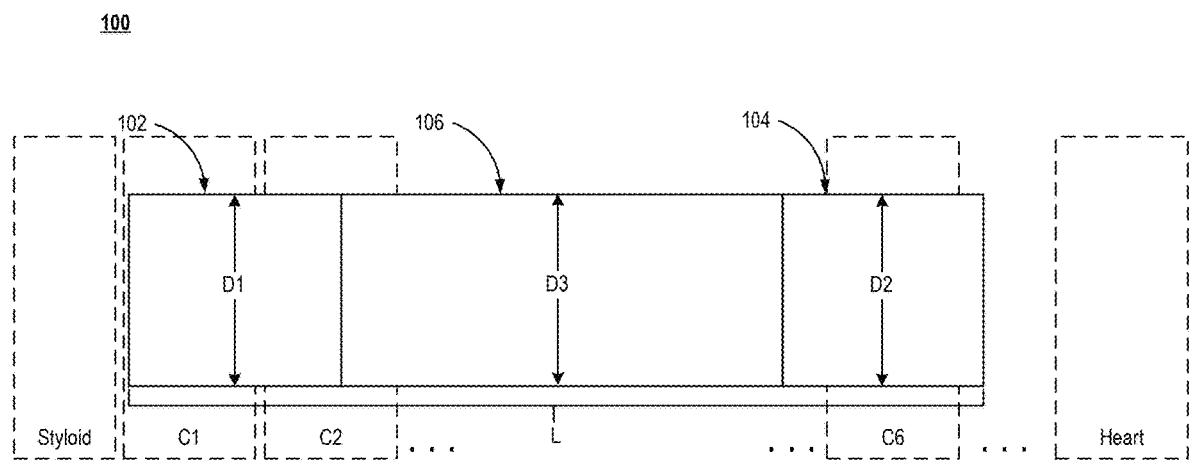
FIG. 1A is a schematic block diagram of a stent for implantation in a jugular vein of a patient, according to an embodiment.

Cerebral venous outflow disorders (CVDs) are becoming an increasingly recognized cause of significant cognitive and functional impairment in patients. CVDs, of which idiopathic intracranial hypertension (IIH) (previously referred to as "pseudotumor cerebri" or "benign intracranial hypertension") is the flagship condition, encompass a spectrum of diseases wherein venous outflow is impaired from the brain due to stenoses involving the skull, neck or chest. CVD's share similar symptoms to IIH including pressure headache, tinnitus, cognitive dysfunction, dizziness, visual abnormalities, and barometric pressure sensitivity, but often in the absence of intracranial pressure (ICP) elevation. The internal jugular veins (IJVs) are the primary pathway through which cerebral venous blood returns to the heart. The IJV, along with the brachiocephalic veins and superior vena cava, can be represented as the "final common pathway" for cerebral venous outflow. Any impairment of outflow involving these veins with insufficient alternative drainage routes can manifest in cerebral venous hypertension or congestion. It has been identified that ICP elevations in IIH are related to elevated intracranial venous pressures. This finding is supported by animal studies demonstrating a pressure-dependent reabsorption mechanism requiring cerebrospinal fluid (CSF) to be roughly 3-5 mmHg higher than venous sinus blood. The venous hypothesis has been expanded upon in recent years, with studies confirming a strong (nearly 1:1) correlation between venous sinus pressures and lumbar puncture opening pressures in patients with IIH-spectrum disorders. Further evidence for the close relationship between venous hypertension and CSF pressure elevation is the immediate reduction in ICP following successful venous sinus stenting in multiple prospective studies, whereby ICP is indirectly reduced through a decrease in venous sinus pressures by alleviating the trans-stenosis gradient. Fundamentally, cerebral venous congestion or hypertension due to impaired venous outflow caused by IJV stenosis can manifest with severe and protean symptoms, which may dramatically impair quality of life and functional capacity in afflicted patients.

With increasing recognition of the role of the IJV in disease pathogenesis, neurointerventionists have begun performing procedures dedicated to treating patients with symptomatic IJV stenosis. For example, a stent can be placed in the IJV to mitigate compression and restore blood flow out of the brain. However, known methods of stenting the IJV typically use stents designed for procedures in other parts of the body, such as the carotid artery (most commonly) or bile duct. Despite the IJV descending immediately adjacent to the internal carotid artery, the IJV does not resemble the carotid artery in form, function, or structure. Instead, the walls of the IJV are thinner, lack elastic layers, and are less muscular compared to arteries, meaning that they are flimsier, more compliant, and more easily compressible by surrounding structures. Additionally the anatomy of the IJV is profoundly different than any other vascular structure in the body, for the following reasons: 1) the IJV begins in the skull (a fixed structure) and then descends through the neck adjacent to mobile structures and terminates in the chest near the clavicle (a relatively fixed structure); 2) the IJV is small below the skull and steadily increases in diameter as it descends to the bony level of C7 where it often times achieves a diameter that is 2-3 times larger than at the skull; 3) the direction of blood flow is retrograde to the chest, such that implanted materials are at risk of migrating towards the chest and into the heart as the vein enlarges caudally; 4) the IJV have multiple potential points of compression from external structures throughout its course, most notably bony compression at the level of C1, lymphatic compression at C2-3, and muscular/carotid compression from C3-7; 5) the IJV is subject to significant dynamic compressive forces with head turning or movement, often from muscular contraction; 6) the IJV has different structures surrounding it at different levels that have variable sensitivity to compression from an implanted stent (e.g., cranial nerves present just below the skull base are quite sensitive to external compression resulting in nerve palsy, whereas muscular relationships predominate lower in the neck and have excellent resilience against rigid implanted stents); and 7) the IJV are highly positional and have different calibers, flow rates and shapes in different head positions. Collectively these different physiologic characteristics make the IJV a very unique vascular structure in the body that is challenging to treat based on current available technologies.

The rising prevalence of jugular vein interventions for various medical conditions has revealed the limitations of existing stents. Existing stents lack adaptability to the diverse anatomies of patients, specifically as it pertains to the IJV, which often results in suboptimal patient outcomes.

As an example, the properties of existing stents make them undesirable for placement in the IJV. The diameters of nearly all carotid, biliary, or venous stents are uniform throughout the length of the stent, whereas the IJV caliber changes considerably over its length. Over-sizing stents in veins may cause injury or mechanically-induced adjacent narrowing, while under-sizing may result in poor wall apposition and migration. Intra-cardiac migration of jugular stents, a potentially catastrophic complication, has been reported due to using improperly sized stents. The length of most carotid artery stents is 2-4 cm, while typically the regions of the IJV that are most subject to stenosis are 9-10 cm in length. Therefore, in existing methods, multiple stents may be used if there are stenoses at multiple locations in the internal jugular vein. For example, when doing jugular vein interventions, some physicians use multiple cylindrical stents telescoped (i.e., concentrically overlapping within one another) inside the jugular vein to achieve the desired outcome. This technique has multiple drawbacks including limited versatility of use, and more importantly, patient safety and risk of stent migration or fracture, emphasizing the need for systems, devices, and methods for jugular vein interventions that can accommodate varying anatomies and procedural requirements.

Existing stent designs can also have framework members (e.g., struts) that are large and/or have large spacing of the annular structures. The large framework members and/or the large spacing of the annular structures result in the stent having a worse contour against the original wall anatomy of the internal jugular vein. This poor contour can lead to several complications, including inadequate support for the vein wall, increased risk of migration, and potential damage to the endothelial lining. Moreover, the mismatch between the stent and the vein's natural curvature can impair blood flow dynamics, potentially leading to turbulent flow and increased risk of thrombosis. In critical applications such as treatment of venous diseases, ensuring that the stent conforms closely to the vein's anatomy is essential for optimal clinical outcomes. The large gaps in the framework can also pose challenges for endothelial cell growth over the stent, which is necessary for long-term integration and function. These potential issues emphasize the need to improve stent design to achieve a better anatomical fit and uniform distribution of support.

Additionally, many conventional stents are flexible in their crimped state to facilitate the delivery of the stent, for example within an artery, but lack flexibility after being deployed. Long-term flexibility can be paramount when addressing IJV stenosis given the significant rotational/dynamic motion of the neck. Therefore, long-term flexibility can help the stent adapt to the natural movements following a jugular vein intervention. A stent that maintains flexibility after deployment can better withstand mechanical stresses, reduce the risk of restenosis, and enhance patient outcomes by providing a more durable and adaptable support structure within the vessel.

Progress in jugular vein interventions has also been hindered by the limitations of fixed-size cylindrical stents. In particular, the middle and lower region of the jugular vein is on average larger in diameter (e.g., ~12-20 mm) than the upper region of the internal jugular vein (e.g., ~5-9 mm). Therefore, the diameters of existing fixed-size cylindrical stents positioned in the internal jugular vein may be inadequate for at least some portions of the internal jugular vein. For example, if the stent is too small for a vessel, a portion of the stent may be left hanging or free-floating in the vessel, which may promote migration of the stent. As another example, if the stent is too large for a vessel, several problems may occur because the excessive pressure exerted on the vessel wall can lead to tissue damage, inflammation, or even rupture. Additionally, an oversized stent can distort the vein's natural geometry and appear on the outside of the vessel, potentially impairing blood flow and increasing the risk of thrombosis. Furthermore, when the stents are too large for the internal jugular vein and are placed to align with at least a portion of the C1 vertebra (e.g., the C1 tubercle of the transverse process) they may also present complications relating to the pinching of nerves that result in shoulder pain, weakness and muscle atrophy, which is a common complication when using carotid stents within the IJV.

The number of jugular vein procedures performed annually continues to increase, driven by the demand for minimally invasive treatments as well as the rising prevalence of conditions warranting jugular vein interventions. Jugular stenting, while not widely utilized presently, is poised for significant growth due to the mounting recognition of symptomatic jugular stenosis as a legitimate diagnosis. Currently, only a handful of physicians undertake jugular stenting procedures, primarily for cases of symptomatic jugular stenosis. Symptomatic jugular stenosis involves blood flow obstruction in the IJV that results in uncomfortable symptoms including headache, head noise, tinnitus, hearing impairments, neck discomfort, stiffness, eye pain, blurred vision, and more. It is believed that jugular stenosis may also be a significant factor in conditions like idiopathic intracranial hypertension (IIH), as described above.

Current practices in jugular stenting rely on makeshift approaches involving the use of generic stents that are not specifically designed for use in the jugular vein. The lack of tailored interventions contributes to challenges during and after implantation such as stent migration, misplacement, and inadequate adaptation to the dynamic forces exerted on the jugular vein. Presently, the absence of appropriately sized stents causes physicians to use two separate stents telescoped together (i.e., concentrically overlapping within one another), which introduces risks of migration or misplacement during the procedure. While telescoping can be effective, this approach poses inherent risks such as potential for complications, resulting in physicians often oversizing the stent when telescoping for safety of the patient.

In response to the growing recognition of symptomatic jugular stenosis as a significant medical concern and to address the inadequacies of existing stents, embodiments described herein relate to stents for implantation in the jugular vein of a patient. The stent for implantation in the jugular vein may be tailored to constraints inherent to the jugular vein as well as configured to accommodate anatomical variations among patients. The stent may be configured to address unique anatomical and dynamic challenges posed by jugular stenosis, thereby expanding treatment options for jugular stenosis and improving outcomes for affected individuals. In some embodiments, the stent may be used to prevent compression of the jugular vein including rotational compression due to rotation of the neck and/or flexion/extension compression due to flexion and extension of the neck.

Important considerations for stent design include stent material, form, fabrication, geometry, and additions. To ensure the appropriate manufacturing method is chosen, the final structure of the stent as well as the application of use of the stent may be taken into consideration. In contrast to existing stents, the stent described herein may be configured to accommodate the unique dimensions of the jugular vein, including variations in diameter and curvature along its course. In some embodiments, the jugular stent may include a tapered body, transitioning from a smaller outer diameter at a first end of the body to a larger outer diameter at a second end of the body. This tapering ensures a smooth transition along the length of the jugular vein, optimizing the stent's conformability to the natural anatomy of jugular vein and minimizing risk of complications.

The jugular vein is dynamic (i.e., regularly moving, compressing, expanding, etc.); therefore, the stent may be configured to resist dynamic forces within the jugular vein including bony compression, rotational movements, hemodynamic changes without compromising the integrity of the functionality of the stent. In jugular stenting, there is a risk of nerve compression, particularly near the upper cervical spine. In some embodiments, the stent may be configured to minimize contact with surrounding neural structures while ensuring adequate venous patency, thereby mitigating risks of nerve compression. For example, dimensions of the stent may be tailored to the jugular vein of a patient to reduce likelihood of the stent contact surrounding nerve structures. Migration of stents in the jugular vein is a serious consideration, as this can potentially be a fatal complication. In some embodiments, the stent may incorporate features to promote stability and prevent migration, reducing the risk of complications during and after the stenting procedure.

Jugular vein stents should exhibit a high degree of adaptability, accommodating the varying anatomies of jugular veins across patients. This adaptability may be crucial for ensuring a secure fit, minimizing the risk of migration, and enhancing overall procedural success. Versatility in sizing is important for jugular interventions. In some embodiments, the stent can be configured to fit different jugular vein sizes (i.e., diameters and/or lengths) to increase success of interventions, reduce post-procedural complications, and improve overall patient outcomes. Embodiments described herein may provide medical professionals with three distinct size options to choose from for procedures (e.g., a small stent, a medium stent, a large stent). This versatility allows customization based on the specific dimensions of the patient's jugular vein, catering to a variety of patient needs and helping to improve effectiveness of the intervention.

The stent may also include a self-expanding mechanism that enables controlled and gradual expansion for predictable and reliable deployment. In some embodiments, the stent may include biocompatible materials to promote long-term compatibility within the vascular system. Implementing materials that are well-tolerated by the body can be important for minimizing the risk of adverse reactions and promoting successful integration. The stent structure may allow for easy delivery to streamline the interventional procedure, enhance overall efficiency of the intervention, reducing operative times, and minimizing patient discomfort. Additionally, adherence to stringent regulatory standards is paramount in vascular interventions. Therefore, the stent may be developed and tested in accordance with regulatory requirements to ensure patient safety, product reliability, and compliance with industry standards.

The jugular stent may be configured to be indicated for neurovascular use, specifically for implantation in the jugular vein. The tapered body and multiple size options provide superior adaptability and reduces the risk of migration and stent-related complications. The stent design is guided by a comprehensive understanding of the anatomical and dynamic factors influencing jugular vein function and pathology. Compared to existing devices with fixed dimensions, the stent described herein offers a more patient-centric and versatile solution for jugular vein interventions. By including any or all of the aforementioned desired characteristics, the stent may provide a comprehensive solution to the unmet needs in jugular vein interventions. The jugular stent aims to not only improve the effectiveness of jugular vein interventions, but also enhance patient comfort and clinical outcomes. The stent may provide a comprehensive solution for jugular vein procedures, thereby advancing vascular medicine.

FIG. 1A is a schematic block diagram of a stent 100 for implantation in an IJV of a patient, according to an embodiment. In some embodiments, the stent 100 may be configured to treat compression in the jugular vein. In some embodiments, the stent 100 may be configured to treat rotation compression that occurs when a patient rotates his or her neck. In some embodiments, the stent 100 may be configured to treat compression occurring due to flexion and/or extension of the neck. The stent 100 may include an elongate body configured to be disposed in the IJV of the patient. The stent 100 may be configured to expand from a first configuration in which the stent 100 is in a compressed state to a second configuration in which the stent 100 expands to anchor against the wall of the vessel. The elongate body may define a lumen configured to allow blood to flow therethrough. As shown, the stent 100 (e.g., the elongate body of the stent) may include a distal end portion 102 including a first diameter D1, a proximal end portion 104 including a second diameter D2, and a central portion 106 therebetween including a third diameter D3. The first diameter D1, the second diameter D2, and third diameter D3 refer to outer diameters of the stent 100 when the stent is an expanded, deployed, or non-compressed configuration. The stent 100 is configured to be implanted in a jugular vein of a patient such that the proximal end portion 104 of the stent 100 is disposed more proximate to a heart of the patient than the distal end portion 102 of the stent 100. In some embodiments, the distal end portion 102 when implanted may approximately align with at least a portion of a styloid bone, a C1 vertebra, and/or a C2 vertebra. In some embodiments, the distal end 102 of the stent 100 when implanted may align with at least a portion of the C1 vertebra (e.g., the C1 tubercle of the transverse process). In some embodiments, the proximal end portion 104 of the stent 100 when implanted may be configured to align with a C4 vertebra, a C5 vertebra, and/or a C6 vertebra of the patient. In some embodiments, the proximal end portion 104 of the stent 100 when implanted may align with the C6 vertebra of the patient. In some embodiments, the proximal end portion 104 may be positioned near a jugular valve of the patient. A cross-section of the stent 100 may be circular, substantially circular, or oval.

The stent 100 may have a length L spanning from the distal end to the proximal end of the stent 100. The length L may be in a range of about 5 centimeters (cm) to about 11 cm, inclusive of all ranges and subranges therebetween. In some embodiments, the length L of the stent 100 may be in a range of about 7 cm to about 9 cm, inclusive of all ranges and subranges therebetween. The physician may choose a stent having a length that corresponds to a length of a portion of the jugular vein between the styloid bone and the C6 vertebrae. For example, for a patient in which a length of the jugular vein between the styloid bone and the C6 vertebrae is approximately 8 cm, a stent with a length L of 8 cm could be implanted. The length L of the stent 100 may be different compared to stents for implantation in other vasculature (e.g., Carotid stents) in order to fit common dimensions of the jugular vein specifically.

In some embodiments, the stent 100 may be configured to taper between the proximal end portion 104 to the distal end portion 102. For example, the second diameter D2 may be larger than the first diameter D1. The diameter D3 of the central portion 106 may decrease from the diameter D2 to the diameter D1 along the length L of the stent 100. In some embodiments, the first diameter D1 may be in a range of about 3 mm to about 12 mm, inclusive of all ranges and subranges therebetween. In some embodiments, the first diameter D1 may be in a range between about 5 mm and 12 mm, inclusive of all ranges and subranges therebetween. In some embodiments, the first diameter D1 may be in a range of about 5 mm to about 9 mm, inclusive of all ranges and subranges therebetween. In some embodiments, the second diameter D2 may be in a range of about 8 mm to about 20 mm, inclusive of all ranges and subranges therebetween. In some embodiments, the second diameter D2 may be in a range of about 10 mm to about 20 mm. In some embodiments, the second diameter D2 may be in a range of about 12 mm to about 16 mm, inclusive of all ranges and subranges therebetween.

In some embodiments, the stent 100 may be offered in three different sizes (a small stent, a medium stent, and a large stent). The small stent may have a second diameter D2 of about 12 mm and a first diameter D1 about 5 mm. The medium stent may have a second diameter D2 of about 14 mm and a first diameter D1 of about 7 mm. The large stent may have a second diameter D2 of about 16 mm and a first diameter D1 of about 9 mm. The different sized stents address the specific needs of patients with varying jugular vein diameters, reducing the risk of complications and ensuring a more effective intervention. For example, the small stent may be ideal for patients with a narrow jugular vein, the medium stent may be suited for moderate vein diameters, and the large stent may be designed for patients with wider jugular veins, ensuring a secure fit and optimal support.

Figure 2:
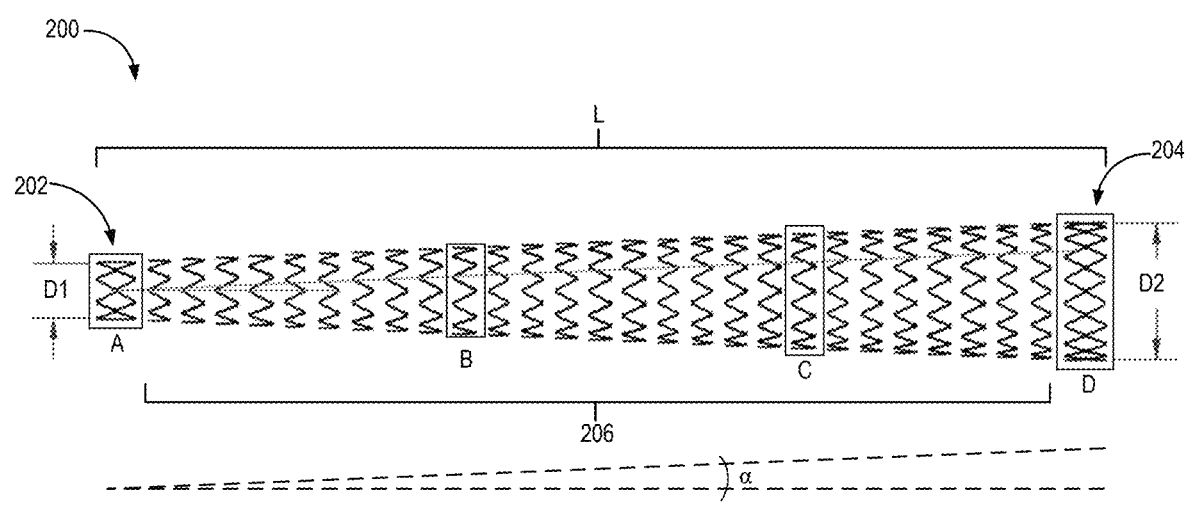
FIG. 2 shows a stent for implantation in a jugular vein having a tapered body, according to embodiments.
Figure 8A:
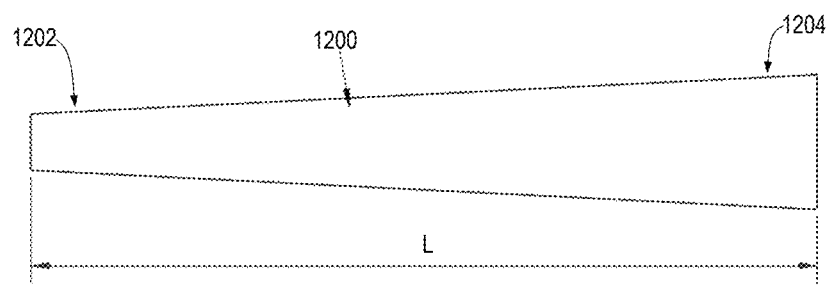
FIGS. 8A-8B show a tapered stent for implantation in a jugular vein, according to an embodiment.
Figure 8B:
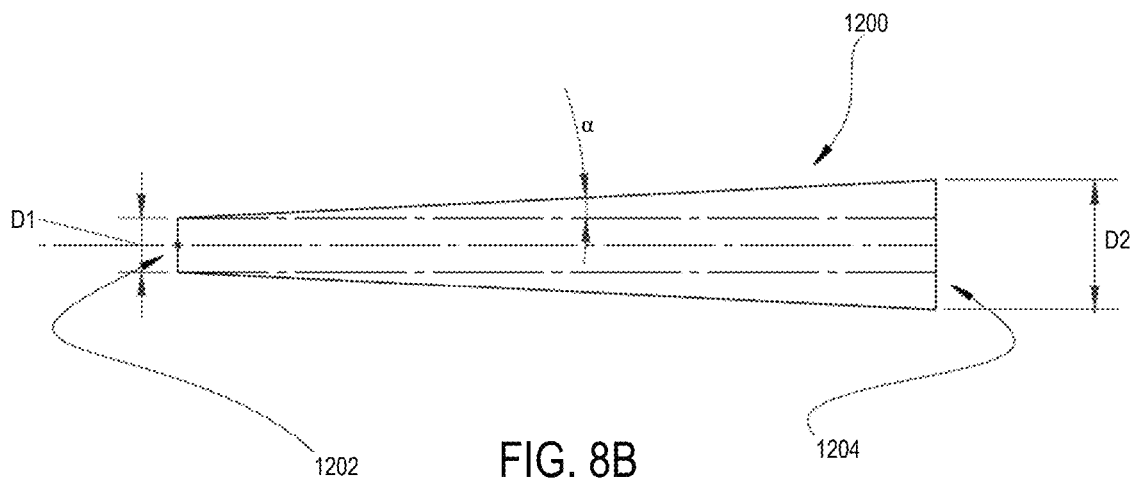
Figure 10:
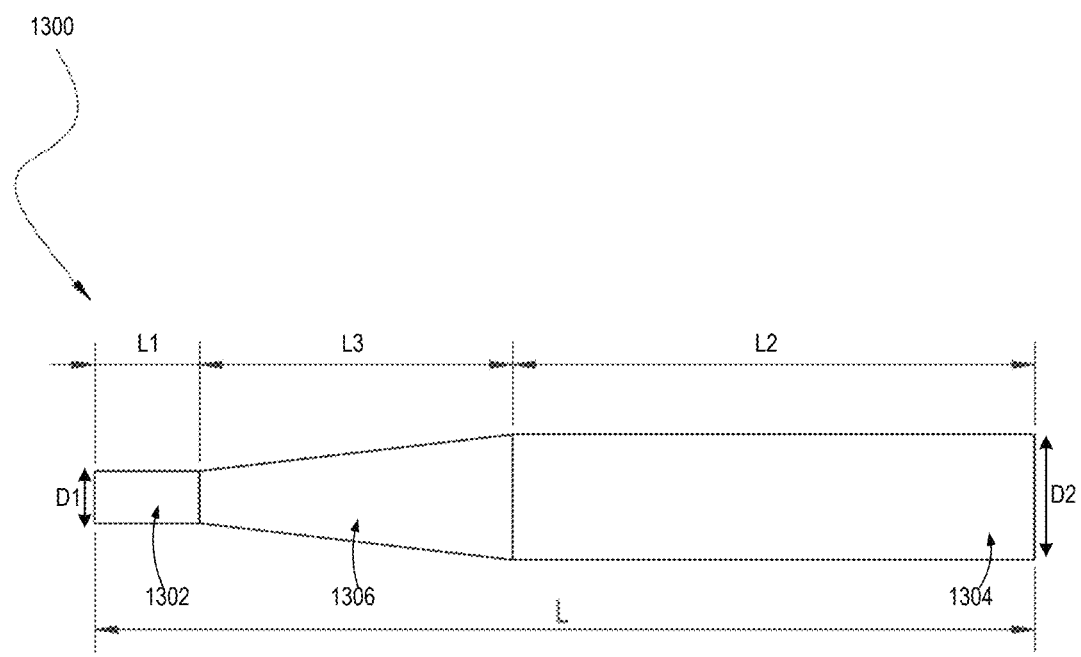
FIG. 10 shows a stent for implantation in a jugular vein including a tapered portion, according to an embodiment.

In some embodiments, a ratio of the second diameter D2 to the first diameter D1 may be in a range of about 1.1 to about 4, inclusive of all ranges and subranges therebetween. In some embodiments, the ratio of the second diameter D2 to the first diameter D1 may be in a range of about 1.7 to about 2.5, inclusive of all ranges and subranges therebetween. In some embodiments, a taper angle (e.g., a degree at which a surface of the stent 100 tapers from D2 to D1) may be constant across at least a portion of the length L of the stent 100. Therefore, the slope $$\left(S = \frac{\frac{D_2 - D_1}{2}}{L}\right)$$

of the surface of the stent 100 may be linear (non-curving) between the distal end portion 102 and the proximal end portion 104, as illustrated in FIGS. 2 and 8A-8B. In some embodiments, the stent 100 may taper across a tapering portion of the stent Lt such that $$\left(S = \frac{\frac{D_2 - D_1}{2}}{Lt}\right)$$

where Lt is less than L, as illustrated in FIG. 10 where Lt is equivalent to L3. In some embodiments, the slope of the surface of the stent 100 from the distal end to the proximal end may be in a range of about 0.05 to about 0.15, inclusive of all ranges and subranges therebetween. In some embodiments, the slope of the surface of the stent 100 may be in a range of about 0.07 to about 0.1, inclusive of all ranges and subranges therebetween. In some embodiments, the slope of the surface of the stent 100 between the distal end portion 102 and the proximal end portion 104 (e.g., the slope in the central portion 106) may be in a range of about 1.1 to about 8, inclusive of all ranges and subranges therebetween. In some embodiments, the slope of the surface of the stent 100 between the distal end portion 102 and the proximal end portion 104 may be in a range of about 3 to about 4, inclusive of all ranges and subranges therebetween. In some embodiments, the slope and/or the taper angle of the stent 100 may correspond to a geometry of the jugular vein of the patient. In some embodiments, the slope and/or taper angle may be above a predetermined threshold to prevent migration of the stent (e.g., toward the heart). In some embodiments, the taper angle may be variable across the length L of the stent 100 such that the slope between the first diameter D1 and the second diameter D2 is non-linear. Further details related to the dimensions of the stent 100 are described in FIG. 2 below.

In some embodiments, an inner diameter of the stent 100 may also be configured to taper between the proximal end 104 of the stent and the distal end 102 of the stent. In some embodiments, the inner diameter may taper proportionally to the outer diameter (e.g., the slope of an inner surface of the stent 100 may be proportional to the slope of the outer surface of the stent 100). In some embodiments, the inner diameter of the stent 100 may taper disproportionally to the outer diameter of the stent 100. For example, the taper angle of the inner diameter may be larger or smaller than the taper angle of the outer diameter.

In some embodiments, the first diameter D1 may be constant across a length of the distal end portion 102, and the second diameter D2 may be constant across a length of the proximal end portion 104. For example, the distal end portion 102 and the proximal end portion 104 may each form a substantially cylindrical or annular shape in the expanded configuration (e.g., as shown in FIG. 10). In the expanded configuration, the central portion 106 may be configured to taper from the second diameter D2 to the first diameter D1. In some embodiments the distal end portion 102 may have a first length, the proximal end portion 104 may have a second length, and the central portion 106 may have a third length. In some embodiments, the first length may be smaller than the second length. In some embodiments, the third length may be smaller than the second length and/or larger than the first length. In some embodiments, the diameter may taper from the second diameter D2 to the first diameter D1 across the third length of the central portion 106. In some embodiments, the second length and the second diameter D2 of the proximal end portion 104 may be configured to anchor the proximal end portion 104 against the wall of the IJV (e.g., a portion of the IJV distal to the jugular valve). For example, the second diameter D2 of the proximal end portion 104 may be larger than a diameter of the jugular valve to prevent the stent 100 from moving proximally through the jugular valve and towards the heart.

In some embodiments, the first length of the distal end portion 102 may be between about 0.5 cm and about 3 cm, inclusive of all ranges and subranges therebetween. In some embodiments, the second length of the proximal end portion 104 may be in a range between about 3 cm and about 7 cm, inclusive of all ranges and subranges therebetween. In some embodiments, the third length of the central portion 106 may be in a range between about 2 cm to about 6 cm, inclusive of all ranges and subranges therebetween.

In some embodiments, a taper angle of the central portion 106 of the stent may be in a range between about 1 degree and about 15 degrees, inclusive of all ranges and subranges therebetween. The taper angle may correspond to a taper angle of the IJV. In some embodiments, the taper angle may be above a predetermined threshold such that the stent 100 anchors to the vessel wall. The sharper taper angle of the central portion 106 can result in a larger ratio of the elongate body of the stent 100 having the maximum diameter (e.g., the second diameter D2) than a stent with a shallower taper angle, thereby reducing the chance of the stent migrating (e.g., proximally towards the heart) once implanted. In some embodiments, the first diameter D1, the second diameter D2, and the taper angle may correspond to an anatomy around the stent 100. For example, the first diameter D1 may correspond to a diameter of a distal portion of the vessel, the second diameter D2 may correspond to a diameter of a proximal portion of the vessel and/or a diameter of the jugular valve. The taper angle of the stent 100 may correspond to a taper angle of the IJV. The stent 100 may be implanted into a target vessel which has a smaller diameter than a maximum diameter of the stent 100 such that the stent applies a force to the vessel wall to keep the vessel wall open (e.g., maintain patency). Therefore, the stent 100 may apply an outward radial force on the IJV within a predetermined range, which is sufficient to anchor the stent 100 relative to the vessel while preventing damage to the vessel and/or surrounding structures. In some embodiments, the stent 100 may be configured to apply to the vessel wall a substantially uniform radial force (e.g., within 15%) across the stent 100.

In some embodiments, the proximal end portion 104 and/or the distal end portion 102 of the stent 100 may flare outwards to further promote anchoring against the vessel wall and reduce risk of migration. For example, the second diameter D2 of the stent 100 may increase at or near the proximal end of the stent 100, and the first diameter D1 of the stent 100 may increase at or near the distal end of the stent 100.

Stent Material:

In some embodiments, the stent may be configured for self-expansion to improve adaptability to vessel contours and minimize procedural complexities. For example, the stent may be manufactured with an initial diameter and compressed to a delivery configuration having a smaller diameter during the delivery process. The stent may include a material including elastic and/or shape memory properties such that the stent may be self-expanding. In some embodiments, the stent may be formed from a material having a low elastic modulus and high yield stress. For example, the stent 100 may be formed from or include any suitable material including, for example, metals, polymers, and/or metal alloys such as nickel-titanium (i.e., Nitinol), copper-zinc-aluminum, iron-manganese-silicon, cold-cadmium, copper-aluminum, copper-aluminum-nickel, or any other suitable material or combination thereof. In some embodiments, the material may include Nitinol, a Nickel-Titanium alloy. Reduced thrombogenicity, low nickel release, and compatibility with soft tissues contribute to a highly biocompatible stent. Nitinol is known for its super-elasticity. The recovery of elastic deformations may be up to 10% with Nitinol. In addition, Nitinol may enable seamless integration within the human body and minimize potential complications. Nitinol's corrosion resistance guarantees long-term durability of the stent 100 in the vascular environment, while Nitinol's biostability maintains structural integrity of the stent 100 over time. Nitinol may enable easy delivery through catheters and precise expansion within the jugular vein.

Stent Form:

Stents are commonly crafted from sheet, tubing, or wire, each offering distinct advantages in the manufacturing process. In some embodiments, the stent 100 may be manufactured using wire or tubing for the versatility and suitability for intricate designs. For example, the stent 100 may be manufactured using Nitinol wire or tubing. Use of Nitinol may be cost-effective in the production process but also optimal for performance in terms of deployability, adaptability, and/or long-term durability within the vascular environment.

Stent Fabrication:

Stent fabrication involves a range of processes, each tailored to the characteristics of the chosen raw material form. Stent fabrication methods include etching, micro-electro discharge machining, electroforming, die-casting, and laser cutting and welding. Among these processes, laser cutting is particularly well-suited for stents made from tubing or wire, especially those crafted from Nitinol. Laser cutting involves the precise removal of excess material from the parent tube or rod using a high-energy density laser, allowing for the creation of intricate stent designs and shapes and ensuring a precise and reproducible manufacturing process. In some embodiments, the stent 100 may be formed from laser cut Nitinol (e.g., laser cut Nitinol tubing) such that the stent 100 defines a plurality of cells or openings. Following laser cutting, the stent 100 can be expanded and heat treated such that the stent is stable at a predetermined diameter. The stent 100 can be smoothed (e.g., electropolished) such that a surface of the stent 100 includes a smooth finish. In addition to laser cutting, the fabrication of the stent 100 may also include laser welding during assembly. Laser welding may be employed to seamlessly join laser cut wires and/or tubing together, forming the desired geometric configuration of the stent. Laser welding can be important for the structural integrity and stability of the stent 100, contributing to the overall effectiveness of the stent 100 in providing vascular support.

In some embodiments, the stent 100 may be pre-shaped to have a spiral configuration. For example, during fabrication the stent 100 may be twisted to a predetermined shape (e.g., with a predetermined pitch angle) and shape-set such that at least a portion of the stent 100 is configured to form a spiral. The pitch of the spiral may be in a range of about 5 degrees to about 45 degrees, inclusive of all ranges and subranges therebetween. In some embodiments, the pitch of the spiral may be about 15 degrees. In some embodiments, the stent 100 when in the spiral configuration may twist a first direction. In some embodiments, the stent 100 when in the spiral configuration may twist a second direction. In some embodiments, the stent 100 may be manufactured for implantation in a particular side of the patient. For example, the stent 100 may be manufactured for implantation in the left IJV. Alternatively, the stent 100 may be manufactured for implantation in the right IJV. In some embodiments, the stent 100 may be configured to be disposed in the right IJV and may be fabricated to have a spiral configuration twisting in the first direction (e.g., clockwise). In some embodiments, the stent may be configured to be disposed in the left IJV and may be fabricated to have a spiral configuration twisting in a second direction opposite the first direction.

Stent Geometry

In some embodiments, the stent 100 may be configured to have a flexibility or rigidity and/or be configured to apply an outward radially force within a predetermined range. Rigidity (e.g., stiffness) of the stent 100 may refer to an ability of the stent 100 to resist deformation (e.g., flex, expand, contract, stretch, compress, etc.) or an ability of the stent 100 maintain its original shape. For example, rigidity may refer to resistance to deformation longitudinally or axially (e.g., along a longitudinal axis of the stent 100), laterally (e.g., oblique to the longitudinal axis of the stent 100), torsionally (e.g., about the longitudinal axis of the stent 100), and/or radially inward. Inversely, flexibility or pliability may refer to the extent to which the stent 100 can deform. In some embodiments, the stent 100 may have a low rigidity or high flexibility (e.g., longitudinally, laterally, and/or torsionally) in the delivery configuration (the non-expanded configuration) to accommodate tortuous pathways during navigation to the IJV and facilitate delivery. In some embodiments, the stent 100 in the expanded configuration may be configured to deform (e.g., longitudinally, laterally, and/or torsionally) to accommodate movements of the neck of the patient. For example, when the patient bends their neck, a first portion of the stent 100 may be configured to compress while a second portion of the stent may expand such that the stent 100 bends with the neck of the patient.

In some embodiments, the rigidity may vary across the length of the stent 100 based on changes in the properties of the IJV along the length of the IJV. For example, a proximal end portion 104 of the stent may have a first rigidity and the distal end portion 102 of the stent 100 may have a second rigidity lower than the first rigidity. In some embodiments, the second rigidity may be configured to deform according to the wall of the vessel to prevent compression of one or more nerves near the wall of the vessel. For example, the distal end portion 102 of the stent may be configured to deform more easily in response to changes in the geometry of the IJV, thereby preventing nerve compression of nerves around a distal portion of the IJV (e.g., cranial nerves), damage to the vessel wall during movement, and/or discomfort. The proximal end portion 104 of the stent may have a rigidity sufficient to anchor the proximal end portion 104 against the wall of the vessel. The first rigidity may be above a predetermined threshold to reduce likelihood of deformation and prevent migration of the stent proximally towards the heart. For example, the first rigidity may prevent the proximal end portion 104 of the stent from being compressed to a diameter smaller than a diameter of the jugular valve such that the stent 100 cannot migrate through the jugular valve towards the heart. In some embodiments, the first rigidity and/or the second rigidity may be above a threshold such that the stent does not compress due to pressure from the walls of the vessel. In some embodiments, the first rigidity and/or the second rigidity may be greater than a rigidity of the wall of the vessel to maintain patency through the inner lumen of the stent 100. In some embodiments, the stent 100 may have a lower overall rigidity than a stent configured for implantation in a carotid artery such that the stent 100 can deform with the IJV as the patient moves.

In some embodiments, the stent 100 may be configured to apply an outward radial force to the vessel wall within a predetermined range. In some embodiments, the predetermined range of radial force may be below a nerve compression threshold to prevent the distal end portion 102 of the stent from causing nerve compression of nerves near C1. In some embodiments, the predetermined range of radial force may be higher than a force the vessel wall applies on the stent 100 such that stent can maintain a passageway for blood to flow therethrough. In some embodiments, the predetermined radial force may be consistent across the length and circumference of the stent. Because the wall of the IJV is more flexible than the wall of the carotid artery, the stent 100 may apply a radial force lower than typical carotid stents, to prevent damage to the IJV. Furthermore, the geometry of the stent 100, such as the diameter and taper angle, may correspond to the vessel wall geometry such that the stent 100 is configured to apply a substantially even radial force on the vessel wall. A size of the stent may be patient-specific such that the radial force applied to the vessel wall is within the predetermined range. In some embodiments, the taper geometry of the stent and/or the design of the connection members and/or annular structures can cause the stent to apply a substantially consistent radial force to the vessel across the body of the stent 100.

The stent 100 may be configured to have a maximum range of motion the stent 100 can achieve. For example, the stent 100 may be configured to bend, twist or torque, radially compress/expand, and/or longitudinally compress/expand a predetermined amount. The range of motion of the stent 100 may be based on the rigidity of the stent 100. The range of motion of the stent 100 may correspond to a typical degree a patient can bend and/or rotate his or her neck. For example, a portion of the stent 100 may be configured to bend (e.g., laterally) to an angle near or equal to a maximum angle the anatomy within the neck surrounding the portion of the stent 100 can bend. In some embodiments, the stent 100 may have a torquability within a predetermined range. In some embodiments, the torquability of the stent may correspond to a typical degree a patient can rotate his or her neck. In some embodiments, the range of motion of the stent 100 may vary across the length of the stent 100. For example, a proximal end portion 104 of the stent 100 may have a lower flexibility (e.g., achieve a smaller range of motion) than the distal end portion 102 of the stent 100. In some embodiments, the range of motion may be constant across the length of the stent 100.

In some embodiments, the mechanical properties of the stent 100 may depend on the stent geometry. Stent geometries can be categorized into categories including: coil, helical spiral, woven, and sequential annular structures. Stents with sequential annular structures (e.g., circumferential strut segments, rings, etc.) can include a plurality of framework members (e.g., struts, expandable structural elements) joined by connection members (e.g., connecting bridges, hinges, or nodes). Stents formed with annular structures may include different structural elements and/or connections, thereby modifying the properties of the corresponding portion of the stent 100.

The stent 100 may include open-cell and/or closed-cell geometries. In a closed-cell design, all internal inflection points are connected by bridging elements. In open-cell design, some or all inflection points are not connected using bridging elements. In some embodiments, the cell geometry of the stent 100 may vary across the length of the stent 100. In some embodiments, at least a portion of the stent 100 may include open-cell geometries to provide flexibility and reduce rigidity to the stent 100. In some embodiments, the entire stent 100 may include open-cell geometries. Because open-cell designs typically have higher flexibility and lower rigidity, an open-cell structure can have improved ability to expand and adapt to a non-circular (or irregularly shaped) cavity wall, such as the IJV, compared to a closed-cell structure. For example, the individual segments of an open-cell stent have less dependence on neighboring segments than in a closed-cell design. Therefore, open cell segments are better suited to conform to irregularities of a non-circular cavity. In some embodiments, the distal end 102 and/or the proximal end 104 may include closed cells, while the central portion 106 of the stent may include open cells, as described in further detail in FIGS. 2, and 3A-3D. Utilizing both types of cell geometries can enable the stent 100 to be flexible or non-rigid in response to the dynamic movements of the jugular vein while also being stable and resistant to migration. For example, portions of the stent 100 having closed-cell geometries may have a higher radial strength and/or rigidity, while portions of the stent 100 having open-cell geometries maintain flexibility of the stent. In some embodiments, the stent 100 may be formed entirely of open cells.

In some embodiments, the stent 100 may be formed of one or more annular structures each including a plurality of framework members including struts (e.g., straight sections) coupled by peaks and valleys to form a zig-zag, serpentine shape undulating pattern, and/or sinusoidal-like pattern. Adjacent annular structures can be joined by one or more connection members, bridges, hinges, or nodes. For example, the stent 100 may include a plurality of annular structures, each annular structure coupled to at least one other annular structure by one or more connection members. In some embodiments, each annular structure may be coupled to an adjacent annular structure via one or more connection members. Therefore, the stent 100 may alternate along its length between the annular structures and connection members. In some embodiments, a peak of a framework member of an annular structure may be coupled to a valley of a framework member of an adjacent annular structure via a connection member. In some embodiments, a plurality of connection members may connect adjacent annular structures. In this way, the stent 100 may be configured to compress during delivery of the stent 100 and expand into a desired shape during deployment of the stent 100. In some embodiments, the connection members between annular structures of the stent 100 may include peak-to-valley (PTV)

connections and/or helical connections, as described in further detail below in FIGS. 4-5B, 6A-7D, and 9A-9B.

At least one of the rigidity, the outward radial force the stent 100, the taper angle, and a ratio of stent free area in the vessel of the stent 100 may be based on at least one of the struts, the annular structures, and/or the connection members. In some embodiments, the connection members, the struts, and/or the annular structures may be configured to achieve a desired mechanical performance of the stent 100, such as its ability to withstand pulsatile blood flow, resist compression, and maintain patency.

The parameters of the connection members may include an angle of the connection member relative to the longitudinal axis of the stent 100, a spacing or period of the connection members around the annular structure, a width of the connection members, and/or a shape of the connection members.

Figure 1B:
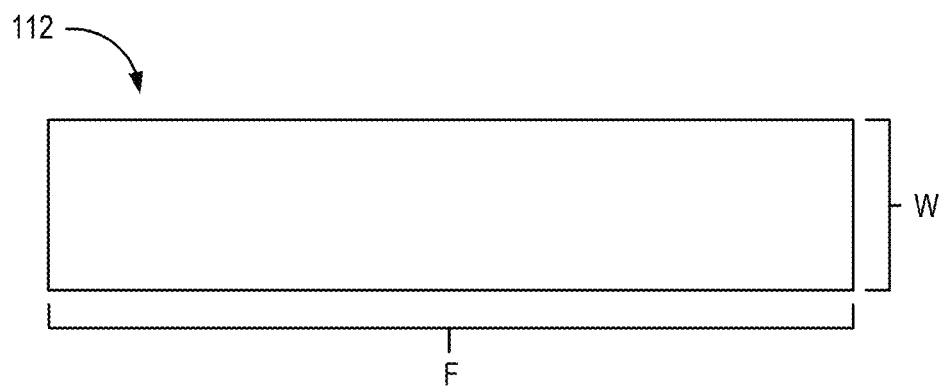
FIG. 1B is a schematic diagram of a side view of a strut of a stent for implantation in a jugular vein of the patient, according to an embodiment.
Figure 1C:
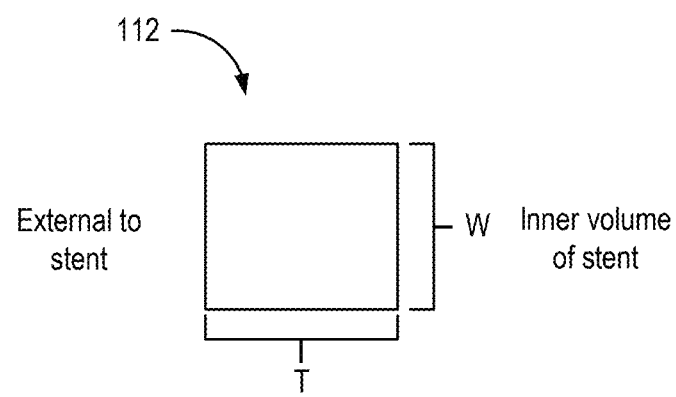
FIG. 1C is a schematic diagram of a front view of the strut, according to embodiments.

As shown in FIGS. 1B-1C, the struts 112 may have different parameters including a length F (e.g., a dimension extending along a longitudinal axis of the stent), a width W, and a thickness T of the strut 112 (e.g., a dimension extending from an outer surface of the stent to an inner volume of the stent). The one or more parameters can impact rigidity and/or radial force of the stent. In some embodiments, the width W of the struts 112 may vary along the length of the stent 100. In some embodiments, the thickness T of the struts 112 may be constant across the length of the stent. In some embodiments, varying a width W of at least a portion of the framework members (e.g., the struts 112) may change the flexibility and/or rigidity of the stent. For example, by increasing the width W of the framework members or struts 112, the corresponding section of the stent 100 has lower flexibility and higher rigidity. In contrast, by decreasing the width W of the framework members and/or struts 112, the corresponding section of the stent has higher flexibility and lower rigidity. In some embodiments, the framework members or struts of the proximal end portion 104 of the stent 100 may have a width W that is greater than a width W of the framework members or struts 112 of the distal end portion 102 of the stent 100. In some embodiments, the width W of the struts 112 may be greater at the proximal end of the stent such that the proximal end of the stent 100 can apply a larger radial force outward than the distal end of the stent. In some embodiments, the width W of the struts 112 may be greater at the proximal end of the stent such that the proximal end of the stent 100 has a higher rigidity than the distal end of the stent.

Parameters of the annular structures may include a width of the annular structure, a peak-to-peak distance between adjacent annular structures, and/or a horizontal spacing between adjacent annular structures. The width of the annular structure may refer to a maximum distance between a distal end of an annular structure and a proximal end of the annular structure. In some embodiments, the width of the annular structure may be equivalent or nearly equivalent to the length (e.g., F) of the struts 112 forming the annular structure. The peak-to-peak distance may refer to a distance between a peak of an annular structure and a peak of the adjacent annular structure (e.g., P in FIG. 6B). The horizontal spacing between annular structures may refer to a horizontal distance between the peak of an annular structure and a valley of the adjacent annular structure (e.g., S in FIG. 6B). In some embodiments, the peak-to-peak distance between adjacent annular structures may depend on the width of the annular structure and the horizontal spacing between the annular structure and its adjacent annular structure. In some embodiments, the peak-to-peak distance may be a sum of the width of an annular structure and the horizontal spacing between the annular structure and its adjacent annular structure.

In some embodiments, the annular structures and/or the connection members may be configured such that the stent 100 has a flexibility and/or a rigidity within a predetermined range. In some embodiments, the connection members may be configured to deform longitudinally and/or bend along their length. For example, the connection members may deform such that the horizontal spacing between adjacent annular structures may be variable, thereby allowing the stent 100 to accommodate changing geometry of the vessel. In some embodiments, the connection members may be non-linear or include a curved portion to allow the connection member to extend or compress along the longitudinal axis of the stent 100. In some embodiments, the connection members may be formed of a compliant material (e.g., Nitinol) and/or have a predetermined shape to allow the connection members to extend or compress along the longitudinal axis of the stent 100 and/or bend along their length. In some embodiments, increasing a width and/or length of the connection members may decrease the flexibility and/or increase the rigidity.

By adjusting and/or varying the connection patterns of the connection members, the stent 100 can be made more durable and effective across a variety of clinical scenarios. In some embodiments, the spacing between the connection members (e.g., a period at which the connection members are disposed around the annular structure) may impact rigidity and/or flexibility of the stent 100. In some embodiments, the period of the connection members may vary across the length of the stent 100. For example, more frequent connections (shorter periods between connection members) can increase rigidity for portions of the stent 100 where more structural support is desired (e.g., the proximal end portion 104), while less frequent connections (longer periods between connection members) can increase flexibility for portions of the stent 100 where more movement is desired (e.g., the distal end portion 102). In some embodiments, more frequent connections of connection members (shorter periods) may increase the stent's 100 resistance to torsional (e.g., torquing, twisting) forces. Additionally, the more frequent connections (shorter periods) may also increase the stent's resistance to bending forces. In some embodiments, the period of the connection members may vary across the length of the stent 100 to achieve tapering of the stent 100. Changing the spacing or period of the connection members from a larger spacing or period at the distal end portion 102 of the stent 100 to a smaller spacing or period at the proximal end portion 104 of the stent 100 can achieve a sharp taper of the stent 100, thereby promoting conformability to the wall of the IJV, maintaining flexibility of the stent 100 within a desired range, and keeping the radial outward force of the stent 100 substantially uniform across the stent 100.

In some embodiments, the connection members may be disposed around the annular structure with any suitable period. For example, the peak of every third framework member in a first annular structure may be connected to the valley of every third framework member in the second annular structure, referred to herein as a connection period of 3. In some embodiments, the connection members may be spaced with a period of 1, a period of 2, a period of 3, a period of 3, a period of 5, a period of 6, a period of 7, a period of 8, a period of 9, a period of 10, a period of 11, a period of 12, or any suitable period.

Figure 6A:
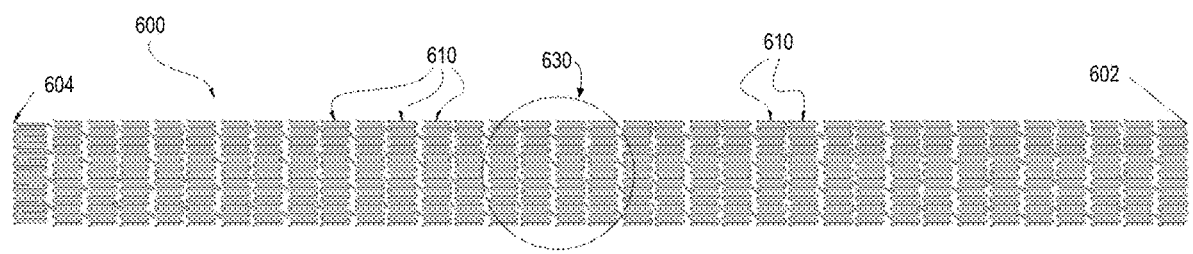
FIG. 6A shows a portion of a stent including annular structures with adjacent annular structures coupled together by connection members, according to an embodiment.
Figure 6B:
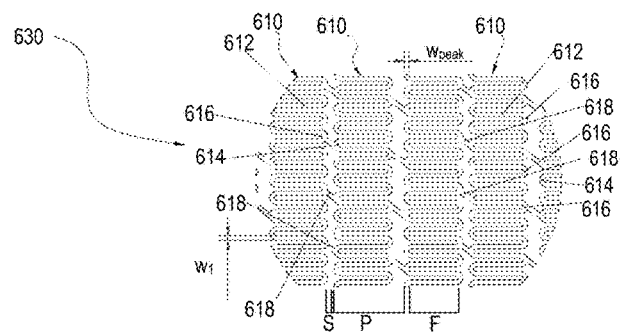
FIG. 6B is a close-up view of the stent of FIG. 6A, according to an embodiment.

A distinguishing feature of stent 100 may be the angled configuration of the connection members. In some embodiments, each connection member can be disposed at a predetermined angle relative to the longitudinal axis of the stent 100 (as shown in FIG. 6A-6B). In some embodiments, the angle of the connection members may be constant around a perimeter of the annular structure. In some embodiments, the angle of the connection members may be constant along a length of the stent 100. In some embodiments, the angle of the connection members may be variable around the perimeter of the annular structure and/or along a length of the stent 100. In some embodiments, the angle of the connection member may depend on a spacing between the framework members the connection member connects, as shown in FIGS. 7A-7D. In some embodiments, the connection members may be disposed at an angle in a range between about 15 degrees and about 60 degrees, inclusive of all ranges and subranges therebetween.

In some embodiments, the angle of the connection members and the period of the connection members may collectively result in the connection members forming a spiral, taper, staggered spacing, or the like, around the body of the stent 100 (as shown in FIG. 6B). This spiraling or staggered configuration of the connection members offers several unique advantages over traditional linear or non-spiraling designs. By spiraling, the connection members can provide a more uniform distribution of mechanical stress along the stent 100, enhancing an overall flexibility of the stent 100 and ability to conform to the natural curves of the vessel. Additionally, the spiraling of the connection members may facilitate twisting of the stent 100 and/or allow the stent to withstand torsional forces or torquing on the stent 100 caused by movement of the patient's neck.

In some embodiments, the angle of the connection members and/or the period of the connection members may impact the rigidity, outward radial force, and therefore the range of motion of the stent 100. For example, the angle of the connection members and/or the period of the connection members may enable the stent to be torqued to a predetermined angle. In some embodiments, the stent 100 may be configured to be torqued to an angle of at least about 5 degrees, at least about 10 degrees, at least about 15 degrees, at least about 20 degrees. Changing the angle of the connection members can change a force that causes the stent to torque to 15 degrees and/or a force that causes the stent to bend to 20 degrees, for example. In some embodiments, the stent 100 may be configured to be torqued to a minimum angle between about 5 degrees and about 15 degrees. In some embodiments, the stent 100 may be configured to be torqued in at least one of a clockwise or counterclockwise direction. In some embodiments, the stent may include a first portion including a first set of connection members configured to promote twisting in a first direction, and the stent may include a second portion including a second set of connection members configured to promise twisting in a second direction opposite the first direction.

In some embodiments, the horizontal spacing between adjacent annular structures may impact flexibility and/or increase rigidity of the corresponding portion of the stent 100. Smaller horizontal spacing between annular structures may further increase rigidity and lower flexibility at the corresponding portion of the stent 100 where the annular structures are located. In some embodiments, smaller horizontal spacing may result in a more consistent or uniform radial force across the length of the stent. In some embodiments, the annular structures may be configured to be disposed at a range of predetermined horizontal spacings. In some embodiments, the horizontal spacing may be constant across the length of the stent. In some embodiments, the horizontal spacing between adjacent annular structures may be variable across the length of the stent 100.

In some embodiments, the horizontal spacing between adjacent annular structures may increase from the proximal end portion 104 of the stent 100 to the distal end portion of the stent 102. In some embodiments, the proximal end portion 104 may include a first set of annular structures and a first set of connection members, and the distal end portion 102 may include a second set of annular structures and a second set of connection members. The adjacent annular structures of the first set of annular structures being disposable at a first range of horizontal spacings from each other, and the adjacent annular structures of the second set of annular structures being disposable at a second range of horizontal spacings from each other. In some embodiments, the average of the first range of horizontal spacings may be smaller than an average of the second range of horizontal spacing such that a rigidity of the stent is larger, and the flexibility is lower in the proximal end portion 104 of the stent 100 than the distal end portion 102 of the stent 100. In some embodiments, the horizontal spacing between adjacent annular structures may be in a range between about 0.10 mm and about 1 mm, inclusive of all ranges and subranges therebetween.

Figure 9A:
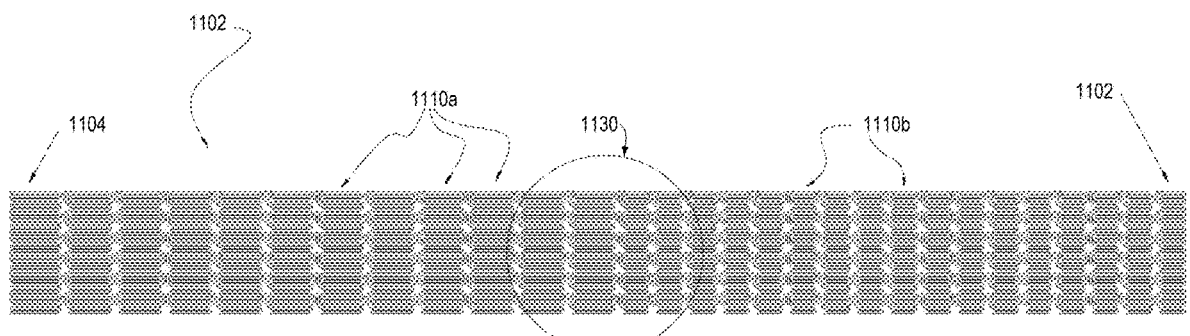
FIG. 9A shows a portion of a stent annular structures with adjacent annular structures coupled together by connection members, according to an embodiment.
Figure 9B:
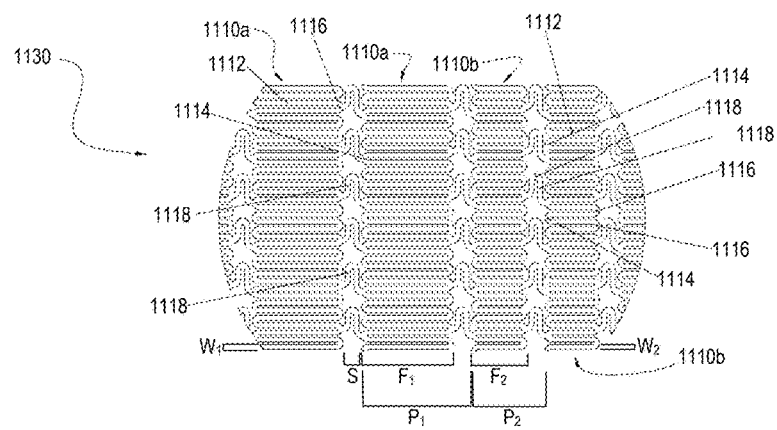
FIG. 9B is a close-up view of the stent of FIG. 9A, according to an embodiment.

In some embodiments, a length of the struts and/or a width of the annular structures may be adjusted to adjust flexibility and/or rigidity of the stent 100 (e.g., width F in FIGS. 6B and 9B). For example, smaller width of the annular structure and/or shorter struts may increase flexibility and decrease rigidity, whereas a larger width of the annular structure and/or longer struts may decrease flexibility and increase rigidity. In some embodiments, the first set of annular structures in the proximal end portion 104 of the stent may have a first width and the second set of annular structures in the distal end portion 102 of the stent may have a second width smaller than the first width (as shown in FIGS. 9A-9B). In some embodiments, the transition between the first set of annular structures and the second set of annular structures may be within the central portion 1106 of the stent. In some embodiments, the transition between the first and second set of annular structures can occur at a maximum of about halfway along the length of the stent and at a minimum more than 1 centimeter (cm) from the distal end of the stent 100.

In some embodiments, the length of the struts and/or the width of the annular structure (e.g., F in FIG. 1B) may be in a range between about 1 mm and about 4 mm, inclusive of all ranges and subranges therebetween. In some embodiments, the width of the first set of annular structures and/or the length of the struts in the proximal portion of the stent 104 may be in a range between about 1.75 mm and about 4 mm, inclusive of all ranges and subranges therebetween. In some embodiments, the width of the second set of annular structures in the distal portion of the stent 102 may be in a range between about 1 mm and about 3 mm, inclusive of all ranges and subranges therebetween.

In some embodiments, the first set of annular structures may have a first peak-to-peak distance therebetween or a first range of peak-to-peak distances therebetween and the second set of annular structures may have a second peak-to-peak distance or a second range of peak-to-peak distances therebetween. In some embodiments, the average of the first range of peak-to-peak distances may be larger than the average of the second range of peak-to-peak distances.

In some embodiments, the annular structures of the stent 100 have a peak-to-peak distance therebetween in a range between about 1 mm to about 5 mm, inclusive of all ranges and subranges therebetween. In some embodiments, the annular structures of the stent 100 may have a peak-to-peak distance therebetween in a range between about 1.8 mm to about 2.2 mm, inclusive of all ranges and subranges therebetween. In some embodiments, the peak-to-peak distance between the first set of adjacent annular structures in the proximal end portion 104 of the stent 100 may be greater than a predetermined distance (e.g., about 2 mm) to prevent fracturing of the stent upon expansion. In some embodiments, the peak-to-peak between the second set of annular structures may be about 2 mm, and the peak-to-peak distance between the first set of annular structures may be larger than about 2 mm. In some embodiments, the peak-to-peak distance between the first set of annular structures may be in a range between about 2 mm and about 4.5 mm, inclusive of all ranges and subranges therebetween. In some embodiments, the peak-to-peak distance between the second set of annular structures may be in a range between about 1.5 mm to about 3.5 mm, inclusive of all ranges and subranges therebetween. In some embodiments, the width of the annular structures and/or the peak-to-peak distance between annual structures may control the radial force outward of the stent.

In some embodiments, varying the number of peaks and valleys per radial distance of the annual structure can change a radial expansion of the stent 100 (e.g., the radial force the stent 100 applies on the vessel when deployed) and/or a rigidity of the stent 100. By adding more peaks and valleys per radial distance, a stent-free surface area of the vein can be reduced (e.g., there may be more stent material abutting the vessel wall). Furthermore, adding more peaks and valleys per radial distance can achieve a greater rigidity or crush resistance (otherwise known as a high radial resistance). In some embodiments, the proximal end portion 104 of the stent may have a larger amount of peaks and valleys per radial distance, and the distal end portion 102 of the stent may have a lower amount of peaks and valleys per radial distance.

In some embodiments, the number of peaks and valleys per radial distance may depend on the angle of the struts relative to the longitudinal axis of the stent 100. In some embodiments, the number of peaks and valleys per radial distance may achieve a predetermined rigidity, radial expansion ability, and/or radial force. In some embodiments, the smaller angle of the struts and/or the higher number of peaks per radial distance may increase rigidity, compressive strength, and/or outward radial force of the stent 100. Conversely, increasing the angle of the struts and/or decreasing the number of peaks and valleys per radial distance may decrease rigidity, compressive strength, and/or the outward radial force of the stent 100.

In some embodiments, at least a portion of the stent 100 may be configured to bend up to about 20 degrees, up to about 30 degrees, up to about 40 degrees, up to about 50 degrees. In some embodiments, at least one of an angle of the connection members, a period of the connection members, a horizontal spacing between adjacent annular structures, and/or a width of the annular structures may allow the stent to bend up to a desired threshold (e.g., 40 degrees). In some embodiments, the desired threshold may correspond to a typical degree a patient can bend their neck.

FIG. 2 show a stent 200 for implantation in a jugular vein having a tapered body, according to embodiments. The stents 200 may be structurally and/or functionally similar to stent 100, and therefore, certain aspects of the stent are not described in further detail with respect to FIG. 2. Stents for jugular interventions may be offered in multiple lengths in order to allow healthcare professionals to select the most suitable stent size based on individual patient characteristics and the specific anatomical features of the jugular vein. For example, the stent for implantation in the jugular vein may be manufactured in different lengths including a short (5 cm-7 cm) length, a medium (7 cm-8 cm) length, and a long (9 cm-10 cm) length. Whether addressing stenosis, occlusions, or other vascular conditions, the availability of multiple lengths ensures precise placement and optimal coverage, ultimately enhancing the effectiveness and success of jugular vein interventions. The length L of the stent 100 may be about 9 cm or about 90 mm. The length L of the stent 100 may be about 8 cm or 80 mm. The length L of the stent 100 may be about 7 cm or 70 millimeters (mm). The variety in stent length improves accessibility for jugular vein interventions to a wide range of patients with diverse anatomies and procedural needs.

As shown, the stent 200 includes a distal end 202 including a first diameter D1 and a proximal end 204 including a second diameter D2. The stent 200 may be manufactured with different width or diameter options including, for example, a small diameter stent (D2=12 mm tapered to D1=5 mm), a medium diameter stent (D2=14 mm tapered to D1=7 mm), or a large diameter stent (D2=16 mm tapered to D1=9 mm). In some embodiments, the stent 200 may have a ratio of the second diameter D2 to the first diameter D1 of about 2.4. In some embodiments, the stent 200 may have a ratio of the second diameter D2 to the first diameter D1 of about 2. In some embodiments, the stent 200 may have a ratio of the second diameter D2 to the first diameter D1 of about 1.78. In some embodiments, the stent 200 may have a short length (e.g., 5 cm-7 cm), a medium length (e.g., 7 cm-9 cm), or a long length (e.g., 9 cm-10 cm). In some embodiments, the diameters D1, D2 of the stent 200 and the length L of the stent 200 may be independent from one another. For example, the stent 200 may have any combination of diameter and length (e.g., a small diameter and a long length, a medium diameter and a long length, a large diameter and a short length, etc.). In some embodiments, the diameters D1, D2 of the stent 200 and the length of the stent 200 may correspond to one another. For example, in some embodiments, the stent may have a small diameter and a short length (e.g., 5 cm-7 cm), the stent may have a medium diameter and a medium length (7 cm-9 cm), or the stent may have a large diameter and a long length (9 cm-10 cm). In some embodiments, the slope S of the stent 200 may be in a range of about 0.05 to about 0.15, inclusive of all ranges and subranges therebetween. These variations ensure compatibility with different jugular vein diameters, enabling precise adaptation and optimal vessel support during interventions. Additionally, the stent 200 may have a taper across the length of the stent 200 having a consistent angle with no variation. In some embodiments, the stent 200 may have a taper angle $\alpha$ defined as tan $$\left(\frac{\frac{D_2 - D_1}{2}}{L}\right).$$

In some embodiments, the taper angle $\alpha$ may be in a range of about 0.5° to about 35°, inclusive of all ranges and subranges therebetween. In some embodiments, the taper angle $\alpha$ may be in a range of about 1.5° to about 15°, inclusive of all ranges and subranges therebetween. As shown, the taper of the stent 200 may be substantially linear and smooth (e.g., no sharp changes in the taper angle, bumps, undulations, etc.)

Figure 3A:
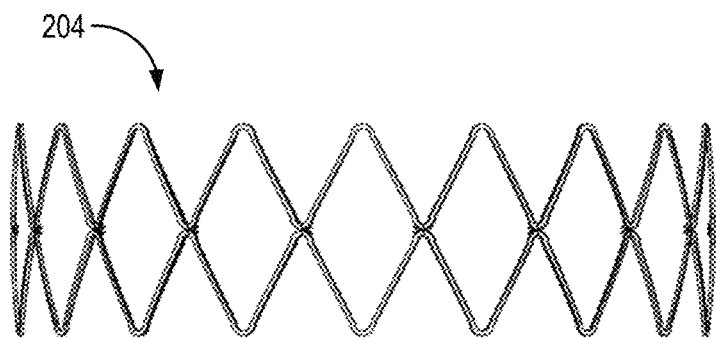
FIG. 3A-3D shows a first, a second, a third, and a fourth annular structure, respectively, of the stent of FIG. 2, according to an embodiment.
Figure 3B:
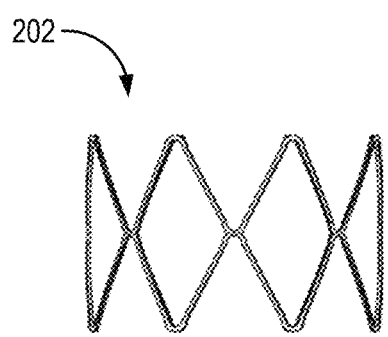

As shown in FIGS. 2 and 3A-3B, the distal end 202 and the proximal end 204 of the stent 200 may each include closed-cell geometries. The closed-cell geometries at the distal end 202 and the proximal end 204 of the stent may enhance structural integrity and procedural efficacy. By connecting all internal inflection points with bridging elements, this closed-cell configuration may ensure robust support and stability at the extremities of the stent. This stability at the ends of the stent 200 can be particularly advantageous in regions where the vessel curvature is more pronounced, minimizing the risk of stent migration or deformation. Furthermore, the closed-cell geometry promotes uniform expansion and conformity along the length of the stent 200, optimizing vessel coverage and reducing the likelihood of complications during deployment.

Figure 3C:
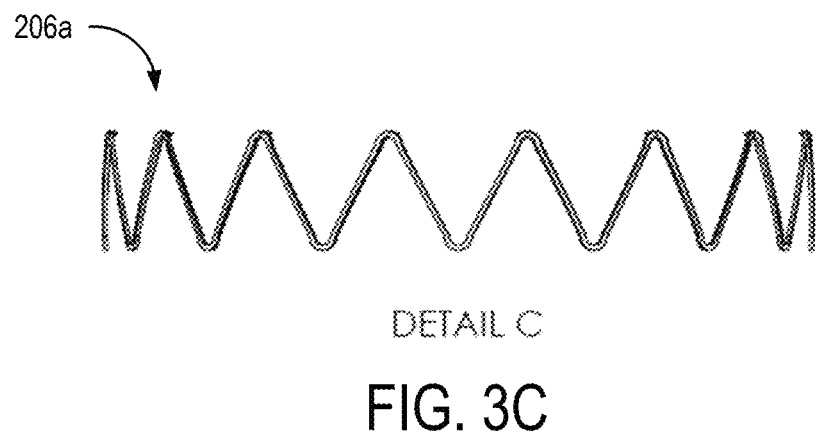
Figure 3D:
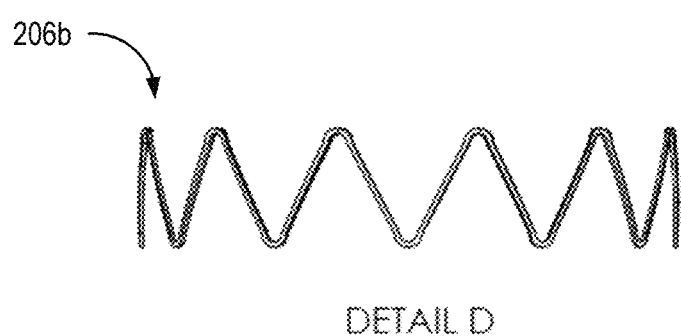

As shown in FIGS. 2 and 3C-3D, annular structures 206a, 206b in the central portion of the stent 200 may include open-cell geometries, meaning some or all of the inflection points may not be connected. The open-cell design in the central portion 206 of the stent 200 may help maintain radial strength while providing flexibility and conformability. By leaving some or all internal inflection points unconnected, this open-cell configuration may enhance flexibility and adaptability of the stent 800 to the dynamic anatomical variations within the jugular vein. Enhanced flexibility and adaptability may reduce risk of vessel trauma during deployment. In combination, the closed cells at the distal and proximal ends 202, 204 provide higher mechanical strength and structural support at the ends of the stent 200 to prevent migration of the stent 200 and streamlining deployment of the stent 200, while the open cells in the central portion 206 of the stent enable the stent 200 to conform to the curvature of the vessel as well as accommodate compression during rotation and/or flexion/extension of the neck of the patient.

While FIGS. 2 and 3A-3D illustrate one row of closed cells at the distal end 202 and one row of closed cells at the proximal end 204, the stent 200 may include any suitable number of rows of closed cells on the distal end 202 and the proximal end 204. In some embodiments, the distal end 202 may include 1 row to 10 rows of closed cells, inclusive of all ranges and subranges therebetween. In some embodiments, the proximal end 204 may include 1 row to 10 rows of closed cells, inclusive of all ranges and subranges therebetween. In some embodiments, the closed cells may not be organized in a row. For example, the closed cells may be distributed along an area of the distal end 202 and/or the proximal end 204. In some embodiments, only the distal end 202 may include closed cells. In some embodiments, only the proximal end 204 may include closed cells. In some embodiments, an entire length of the stent 200 may include open cells connected by bridge connections. In some embodiments, an entire length of the stent 200 may not have any open cell geometry, and may instead only have closed cell geometry The desired properties of the stent for jugular vein interventions may be achieved through the bridge structure. The bridge structure refers to the way in which cells in the stent are coupled to one another to give the stent structure. In some embodiments, the stent bridge structure may incorporate peak-to-valley (PTV) bridge connections and/or helical flex bridges between layers or rows of struts. The PTV bridge connections include a connector strut (e.g., metal, polymer, metal alloy, alloy, etc.) linking adjacent peaks and valleys of separate stent struts at an angle, enhancing structural integrity and flexibility. In contrast, the helical flex bridges connect peaks and valleys of non-adjacent stent struts through helical bands or curved bands (e.g., metal, polymer, metal alloy, alloy, etc.) that taper around the stent's diameter, allowing for intricate flexibility adjustments. By combining one or more PTV bridge connections and helical bands with varying taper angles, the stent can be precisely controlled to achieve the desired characteristics associated with flexibility, adaptability, and/or mechanical strength for optimal performance specific to jugular vein interventions. The ability to precisely control both the flexibility and the mechanical (e.g., radial strength) of the strut enables customizable treatments for symptomatic jugular stenosis, potentially improving patient outcomes and quality of life.

Figure 4:
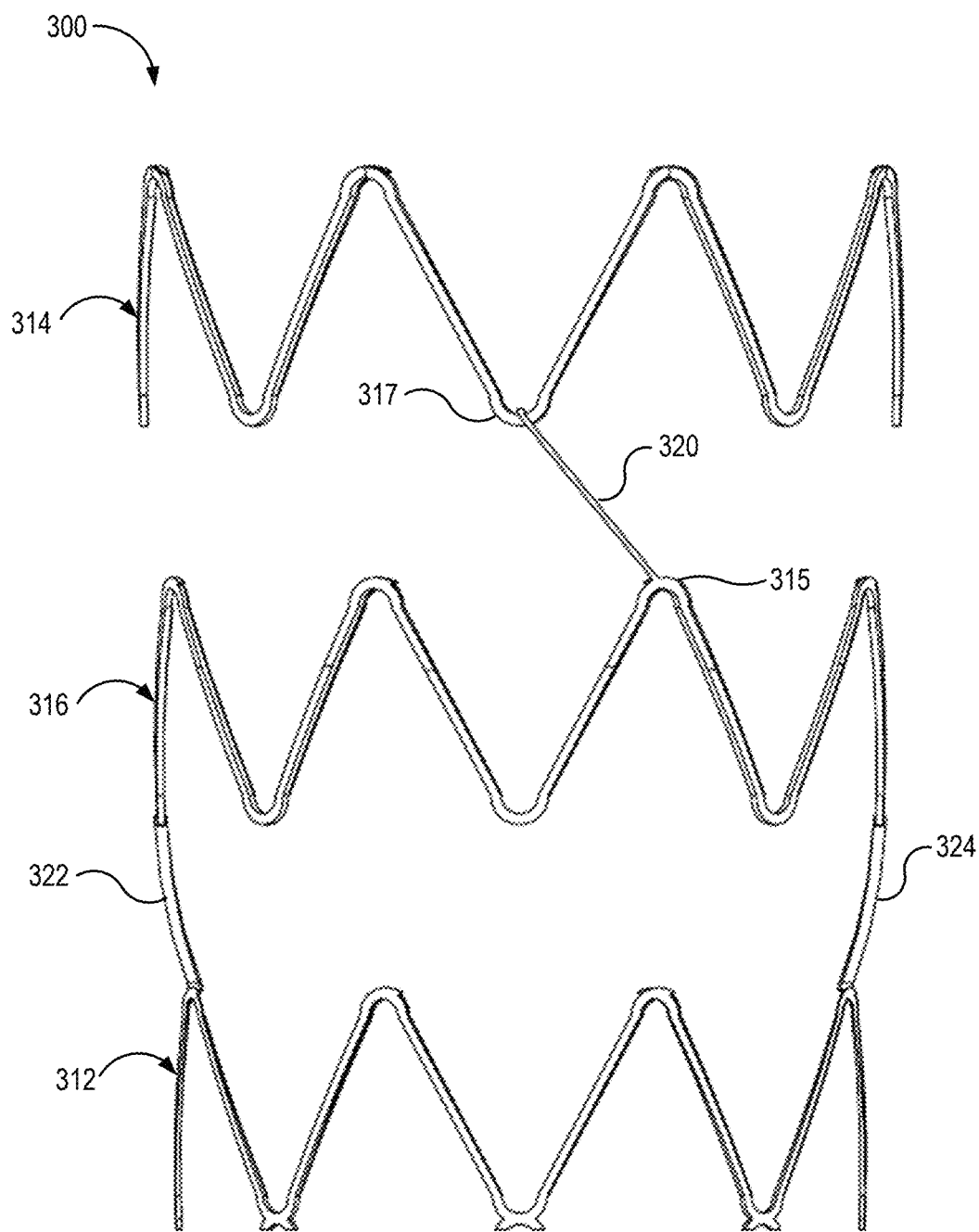
FIG. 4 shows a portion of a stent for implantation in a jugular vein including peak to valley (PTV) bridge connections between cells of the stent, according to an embodiment.

FIG. 4 shows a portion of a stent 300 for implantation in a jugular vein including peak to valley (PTV) bridge connections between struts of annular structures of the stent 300, according to an embodiment. The portion of the stent 300 includes a first open cell row 314 close to a proximal end of the stent 300, a second open cell row 316 below the first open cell row, and a third open cell row 312 below the second open cell row 316 and closer to a distal end of the stent 300. As shown, The PTV bridge connection includes a strut connector 320 that connects a peak of a first strut 315 and a valley of a second strut 317. In some embodiments, the stent 300 may include any suitable number of cells per cell row. For example, the stent 300 may include between about 4 cells and 36 cells, inclusive of all ranges and subranges therebetween. In some embodiments, the stent 300 may include between about 4 cells and about 10 cells, inclusive of all ranges and subranges therebetween. The stent 300 may include any suitable number of strut connectors 320 connecting two adjacent cell rows (e.g., the first open cell row 314 and the second open cell row 316). For example, the stent 300 may include between about 1 strut connector 320 and 36 strut connectors 320, inclusive of all ranges and subranges therebetween. In some embodiments, the stent 300 may include between about 1 strut connector 320 and 10 strut connectors 320, inclusive of all ranges and subranges therebetween.

In some embodiments, the strut connectors 320 connecting two adjacent cell rows may be spaced around a circumference of the stent 300 with a predefined angle between each adjacent strut connector. In some embodiments, the angle between adjacent struts may be in a range of about 10 degrees to about 180 degrees, inclusive of all ranges and subranges therebetween. In some embodiments, the angle between adjacent struts may be in a range of about 30 degrees to about 90 degrees, inclusive of all ranges and subranges therebetween. In some embodiments, the angle between adjacent struts may be about 90 degrees (e.g., there are four strut connectors 320 distributed around the circumference of the stent 300). In some embodiments, the strut connectors 320 may be uniformly spaced around the circumference of the stent 300. In some embodiments, the strut connectors 320 may be non-uniformly spaced around the circumference of the stent 300. In some embodiments, the strut connector 320 may connect cells that are adjacent to one another. For example, a strut connector 320 may couple the peak of a strut 315 in the second open cell row to a valley of a strut 315 in the first open cell row, the peak of the strut 315 being adjacent to the valley of the strut 317 In some embodiments, the strut connector 320, 322, 324 may be laser cut and/or laser welded during and/or after manufacturing of the stent 300. PTV bridge connections 320, 322, 324 may be configured to distribute radial forces, minimizing stress concentrations and potential points of weakness. Moreover, a precise placement of bridge connections may enable optimal flexibility and conformability resulting in (1) easier deployment and (2) the stent conforming to intricate contours of the jugular vein.

In addition to the standard peak to valley bridge connections linked every 90 degrees between layers, the stent may have further variation in bridge design. These variations may include curved bridge connections. For example, the bridge may have a contour configured to accommodate the natural curvature of the jugular vein.

Figure 5A:
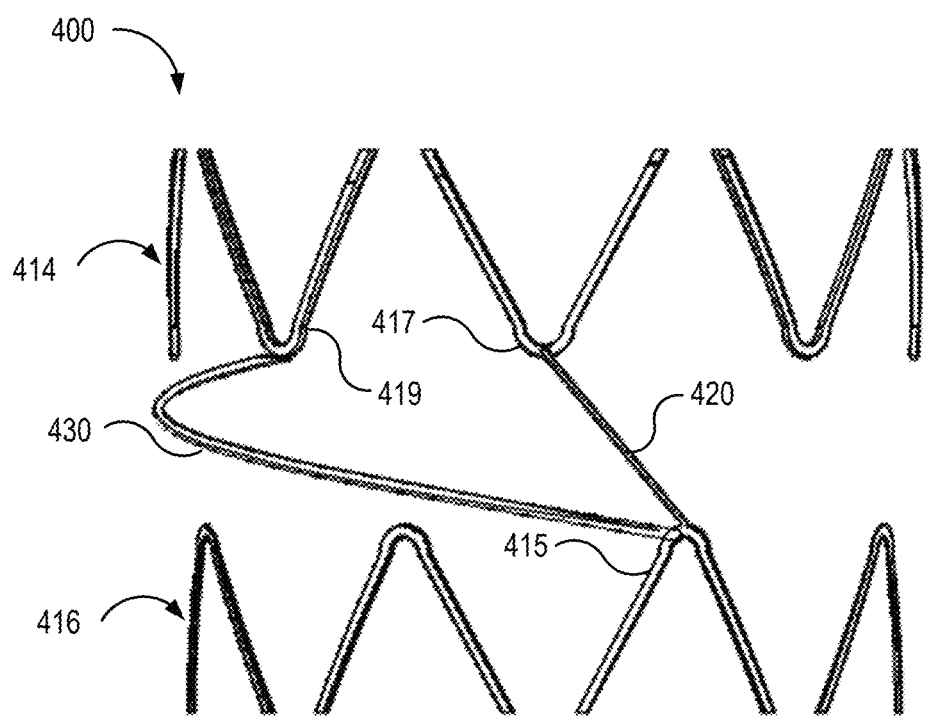
FIGS. 5A-5B show two different views of a stent for implantation in a jugular vein including a PTV bridge connection and a helical bridge connection between cells of the stent, according to an embodiment.
Figure 5B:
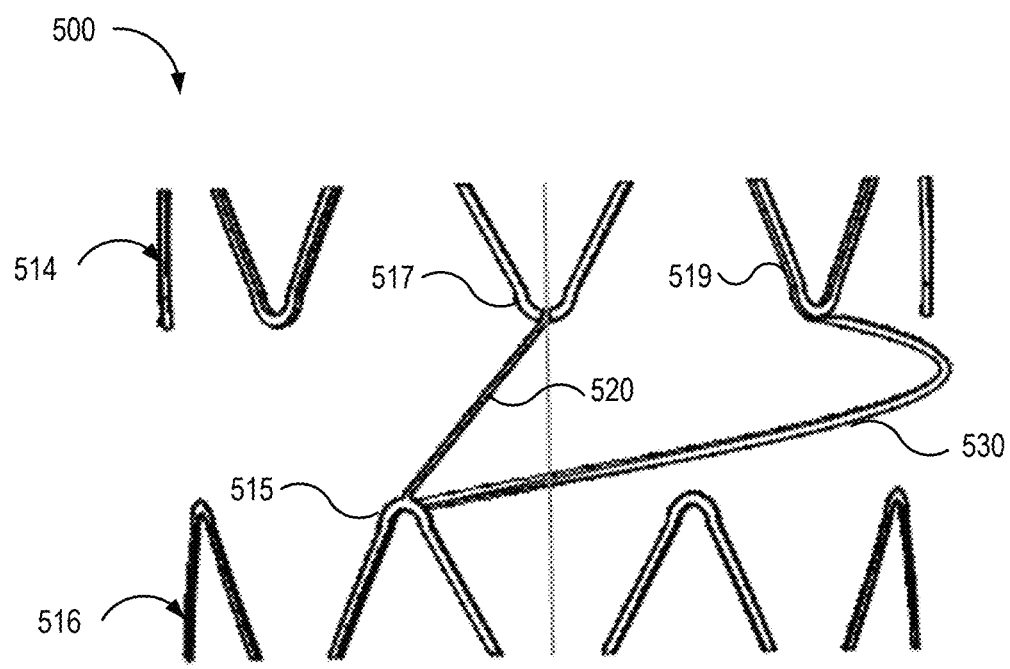

FIGS. 5A-5B shows a portion of stents 400, 500 including a PTV connection 420, 520 and a helical flex bridge connection 430, 530 between cells of the stent 400, 500, according to an embodiment. As shown, the portion of the stent 400, 500 includes a first row 414, 515 of open cells and a second row 416, 516 of open cells below the first row. The PTV bridge 420, 520 includes a strut connector that connects a peak of a first strut 415, 515 and a valley of a second strut 417, 517. In some embodiments, the peaks and valleys that are connected by the PTV bridge may be adjacent to one another in the stent's 400, 500 structure. In some embodiments, the peaks and valleys that are connected may not be adjacent to one another. The PTV bridge connection 420, 520 may be structurally and/or functionally similar to the PTV bridge connection 320, and therefore certain aspects of the PTV bridge connection 320 are not described in further detail herein.

The helical flex bridges 430, 530 may be disposed between layers or rows of the stents 400, 500 and may connect peaks and valleys that are not adjacent to one another. Rather the peak of one stent strut 415, 515 may be connected through a helical band that curves or tapers around the diameter of the stent 400, 500 to a valley of a strut 419, 519 that may not be immediately adjacent. A plurality of helical bands and PTV bridge connections may be used in conjunction with each other in between struts of the stent 400, 500 to achieve a desired flexibility of the stent. Additionally, a plurality of helical bands with differently radius of curvatures may be used to control flexibility of a section of the stent 400, 500. Through any one of or combination of these different strut connections, the stent 400, 500 may have a flexibility (e.g., measured by an angle at which the stent can bend away from a longitudinal axis of the stent) and a radial strength (e.g., measured by an angle at which the stent can rotate about the longitudinal axis of the stent) each in a predetermined range corresponding to an environment of the jugular vein. For example, the stent 400, 500 may be configured to bend away from a longitudinal axis of the stent (e.g., bend away from a centerline of the stent) at an angle in a range of about 10 degrees to about 40 degrees, inclusive of all ranges and subranges therebetween. In some embodiments, the stent 400, 500 may be configured to bend at an angle from the longitudinal axis of the stent of about 25 degrees. In some embodiments, the stent 400, 500 may be configured to rotate about the longitudinal axis of the stent 400, 500 at an angle in a range of about 10 degrees to about 40 degrees, inclusive of all ranges and subranges therebetween. In some embodiments, the stent 400, 500 may be configured to rotate about the longitudinal axis of the stent 400, 500 at an angle of about 30 degrees.

FIG. 6A shows a plain view of a portion of a stent 600 in a non-expanded configuration including an elongate body having a proximal end portion 604 and a distal end portion 602 and including a plurality of annular structures (e.g., circumferential strut segments) 610, according to an embodiment. The annular structures 610 may include a plurality of framework members 612 including struts coupled by peaks and/or valleys. The top ends of the struts of the stent 600 can be joined and/or be continuous with the bottom ends to the struts such that the stent 600 forms a substantially cylindrical shape. FIG. 6B illustrates an example of the framework members 612 of the stent 600. As shown, the annular structures 610 may include frame members 612 coupled by connection members 618. In some embodiments, the connection members 618 may be angled relative to a longitudinal axis of the stent 600. In some embodiments, the framework members 612 may be arranged in any suitable pattern (e.g., a zigzag pattern, serpentine pattern, and/or an undulating pattern) having a plurality of peaks 614 and a plurality of valleys 616. As described herein, the straight portions of the annular structures 610 between the peaks and the valleys may be referred to herein as the struts. The annular structures 610 may each be coupled to at least one other annular structure 610 by one or more connection members 618. In some embodiments, each annular structure 610 may be coupled to an adjacent annular structure 610 via one or more connection members 618. For example, a peak 616 of a framework member 612 of a first annular structure 610 may be coupled to a valley 615 of a framework member 612 of a second annular structure 610 via a connection member 618.

In some embodiments, the annular structures 610 may have a peak-to-peak distance P therebetween, a width F, and a horizontal spacing S. In some embodiments, the width of the annular structures (and/or the length of the framework members or struts 612) F may be between about 1 mm to about 4 mm, inclusive of all ranges and subranges therebetween. In some embodiments, the horizontal spacing S between adjacent annular structures may be between about 0.33 mm to about 1 mm, inclusive of all ranges and subranges therebetween. In some embodiments, the peak-to-peak distance between annular structures P may be between about 1.33 mm to about 5 mm, inclusive of all ranges and subranges therebetween.

In some embodiments, the framework members or struts 612 may have predetermined dimensions. In some embodiments, the straight portion of the struts 612 may have a second width $w_1$. The peak 614 and/or valley 616 of each framework members or struts 612 may have a first with $W_{peak}$. In some embodiments, the first width W1 and the second width $W_{peak}$ may be equivalent. In some embodiments, the framework members or struts 612 may have a predetermined thickness (not shown in FIG. 6B). The first and second widths $W_1$, $W_{peak}$ may be in a range between about 0.09 mm and about 0.25 mm, inclusive of all ranges and subranges therebetween. In some embodiments, the flexibility and/or rigidity of a portion of the stent 600 may be determined by the width $W_1$ and/or the width $W_{peak}$ of the framework members or struts 612, the width of the annular structures F, the peak-to-peak distance of the annular structures P, and/or the horizontal spacing (or range of horizontal distances S) between the annular structures 610. In some embodiments, the width $W_1$ of the struts 612 may vary across the length of the stent 600. For example, the width $W_1$ may be greater at the proximal end 604 of the stent than the distal end 602 of the stent 600.

In some embodiments, annular structures 610 of the stent 600 can have any suitable number of peaks 614 and valleys 616. In some embodiments, each annular structure 610 of the stent 600 may have the same number of peaks 614 and valleys 616. In some embodiments, the annular structures 610 across the stent 600 may have varying number of peaks 614 and valleys 616. In some embodiments, each annular structure 610 may have about 12 peaks 614 and 12 valleys 616 with a subset of peaks 614 and a subset of valleys 616 connected via angled connection members 618. Although annular structure 610 with 12 peaks 614 and 12 valleys 616 is illustrated in FIGS. 6A-6B, other schemes are contemplated. For example, the number of peaks 614 and valleys 616 used in the design of the stent may increase, decrease, be variable across the body of a stent 100. By varying the number of peaks and valleys in the annular structures, stent designs can be customized to balance flexibility, support or rigidity, and/or radial force, ensuring that the stent can effectively adapt to the diverse anatomical and functional requirements of different vascular regions. This versatility enhances the overall performance and applicability of stents in various clinical scenarios, improving patient outcomes by providing tailored solutions for vascular interventions.

In some embodiments, the flexibility, rigidity, and/or taper of the stent 600 may be determined by one or more parameters of the connection members 618 (e.g., an angle, periodicity, thickness, length, etc.). As shown in FIG. 6B, the peak 614 of every third framework member 612 in the first annular structure 610 may be connected the valley of every third framework member in the second annular structure, referred to herein as a connection period of 3. Although a PTV connecting scheme with a period of three is illustrated in FIG. 6B, it should be appreciated that the stent 600 may include any period of connection members 618. In some embodiments, the period of connection members 618 may be constant within an annular structure 610. In some embodiments, the period of connection members 618 may be constant across annular structures 610 of the stent 600. In some embodiments, the period of connection members may vary within a given annular structures 610 and/or vary across annular structures 610 of the stent 600. In some embodiments, the period of the connection members 618 may be 1, 2, 3, 4, 5, 6, 7, 8, 9, 10, 11, 12 and/or a combination thereof. In some embodiments, the connection members 618 may connect peaks 614 of the first annular structure to valleys 616 of the second annular structure 610 that are immediately adjacent to the peaks 614, as shown. In some embodiments, the peaks 614 and valleys 616 connected may not be immediately adjacent.

A distinguishing feature of stent 600 can be one or more parameters of the connection members 618. In some embodiments, the connection members 618 may spiral around the body of the stent 600. The angle in which the angled connection members 618 spiral circumferentially around the body of the stent 600 is determined by the angle of the connection members 618 relative to the longitudinal axis of the stent 600 and/or the spacing or period of the connection members 618. This spiraling configuration offers several unique advantages over traditional linear or non-spiraling designs. By spiraling, the connection members 618 provide a more uniform distribution of mechanical stress along the stent 600, increasing the flexibility across the length of the stent, thereby enhancing the ability of the stent 600 to conform to the natural curves of the vessel.

Figure 7A:
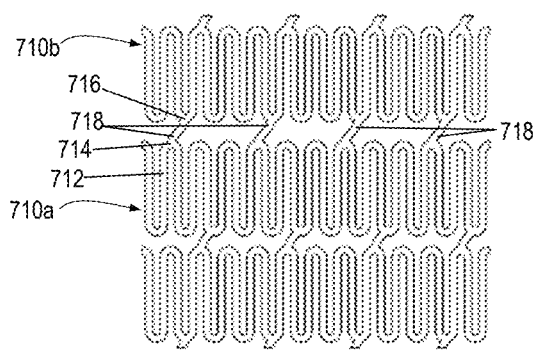
FIGS. 7A-7D show connection patterns of connection members coupling adjacent annular structures, according to different embodiments.

FIGS. 7A-7D show different patterns of connection members 718, 818, 918, 1018, according to different embodiments. As shown in FIG. 7A, the peak 714 of an annular structure 710a is connected to a valley 716 of a second annular structure 710b that is immediately adjacent to the peak 714 by a connection member 718. Therefore, the connection member 718 forms a first angle relative to a longitudinal axis of the stent. As shown, the connection members 718 have a period of 3 (e.g., every third framework member 712 is coupled by a connection member 718).

Figure 7B:
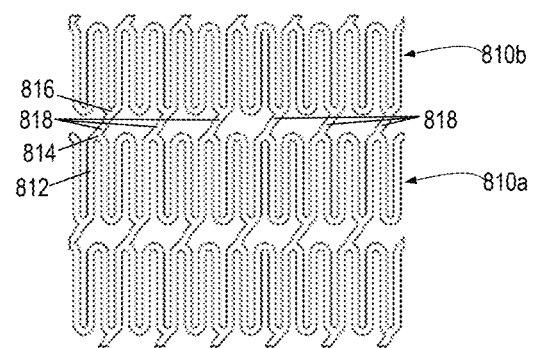
Figure 7C:
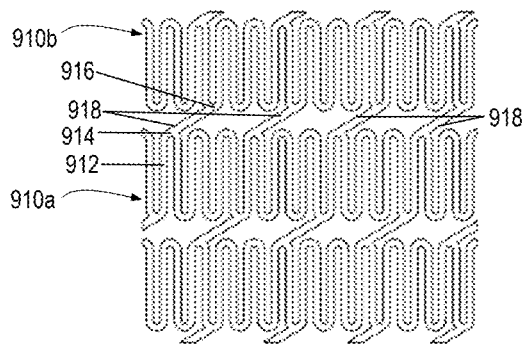

Similarly, FIG. 7B shows annular structures 810 in which the peaks 814 of a first annular structure 810a are coupled to valleys 816 of the second annular structure 810b, the valleys 816 immediately adjacent to the peaks 814. In FIG. 7B, the connection members 818 have a period of 2 (e.g., every other framework member 812 is connected by a connection member 818). In contrast, as shown in FIG. 7C, peaks 914 of a first annular structure 910a may be coupled to valleys 916 of a second annular structure 910b not directly adjacent to the peaks 914 via a connection member 918. Therefore, the connection members 918 may form a second angle relative to the longitudinal axis of the stent larger than the first angle. As shown, the connection members 918 have a period of 3 (e.g., every third framework member 912 is coupled by a connection member 918.)

Figure 7D:
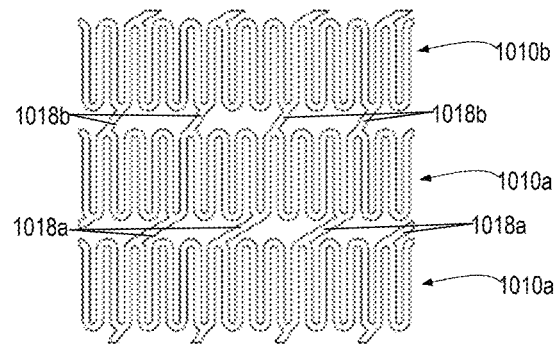

Furthermore, the angled connection members may connect the peaks and valleys between annular structure with a consistent pattern (shown in FIG. 7A, FIG. 7B, and FIG. 7C), a non-consistent pattern or a varied connection pattern (as shown in FIG. 7D), or any suitable pattern. As shown in FIG. 7D, a pattern of connection members 1018a between a first annular structure 1010a and a second annular structure 1010b may be different than a pattern of connection members 1018b between the second annular structure 1010b and a third annular structure 1010c. Varying the connection patterns and periods of the connection members 1018a, 1018b may allow for adjustments in the flexibility and/or rigidity of the stent 1000 along different portions of the stent 1000. For example, more frequent connections (shorter periods) can increase rigidity for areas that require more structural support, while less frequent connections (longer periods) can increase flexibility for portions of the stent 1000 that should accommodate more movement. Different angled connection schemes can be designed to optimize the mechanical performance of the stent, such as its ability to withstand pulsatile blood flow, resist compression, and maintain patency. By fine-tuning the angled connection patterns, the stent can be made more durable and effective in a range of clinical scenarios.

FIGS. 8A-8B show a stent 1200 including a tapered body, according to an embodiment. The stent 1200 may include any of the geometries described herein (e.g., geometries patterns described with respect to FIGS. 1A-1B, 2-3D, 6A-6B, and/or 9A-9B). In some embodiments, the stent 1200 may define an elongate body including a plurality of annular structures coupled to one another by connection members (e.g., angled connection members). In some embodiments, the elongate body may include a proximal end portion 1204 and a distal end portion 1202. The distal end portion 1202 may have a first diameter D1, and the proximal end portion 1204 may have a second diameter D2 larger than the first diameter. The elongate body may taper from the second diameter D2 to the first diameter D1 over a total length L of the stent 1200 with a predetermined taper angle $\alpha$. Certain aspects of the stent 1200 may be structurally and/or functionally similar to the stents described herein, and therefore certain features of the stent 1200 are not described herein with respect to FIGS. 8A-8B.

FIG. 9A shows a plain view of a portion of a stent 1100 in a non-expanded configuration including elongate body having a proximal end portion 1104 and a distal end portion 1102 and including a plurality of annular structures 1110a, 1110b (e.g., sequential strut segments, circumferential members, etc.), according to an embodiment. The top ends of the struts of the stent 1100 can be joined and/or be continuous with the bottom ends to the struts such that the stent 1100 forms a substantially cylindrical shape. FIG. 9B is a close-up view of section 1130 of stent 1100 illustrating an example of framework members 1112 of the stent 1100. As shown, the annular structures 1110*a*, 1110*b* may include frame members 1112 including struts (e.g., straight portions) and connection members 1118. In some embodiments, the framework members 1112 may be arranged in any suitable pattern (e.g., a zigzag pattern, serpentine pattern, and/or an undulating pattern) having a plurality of peaks 1114 and a plurality of valleys 1116. The annular structures 1110*a*, 1110*b* may each be coupled to at least one other annular structure 1110*a*, 1110*b* by one or more connection members 1118. In some embodiments, each annular structure 1110*a*, 1110*b* may be coupled to an adjacent annular structure 1110*a*, 1110*b* via one or more connection members 1118. For example, a peak 1114 of a framework member 1112 of a first annular structure 1110*a* may be coupled to a valley 1116 of a framework member 1112 of a second annular structure 1110*b* via a connection member 1118. In some embodiments, the connection members 1118 may be non-linear. For example, the connection members 1118 may form a bend, curve, "U" shape, etc. In some embodiments, the connection members 1118 may be deformable longitudinally, rotation, and/or transversely such that the stent 1100 can accommodate curvature of the vessels. Although the connection members 1118 are shown with a connection pattern and period, it should be appreciated that the connection members 1118 may have any suitable parameters, such as those described with respect to the connection members of FIGS. 6A-7D. For example, an angle and/or period of the connection members 1118 may be tailored to achieve a desired flexibility (e.g., a specific range of motion corresponding to the patient's anatomy) and/or rigidity (e.g., bendability, stretchability, and/or torquability) along the length of the stent 1100.

In some embodiments, the proximal end portion 1104 may include a first set of annular structures 1110*a* and a first set of connection members, and the distal end portion may include a second set of annular structures 1110*b* and/or a second set of connection members. In some embodiments, the first set of annular structures 1110*a* may be disposable at a first peak-to-peak distance or a first range of peak-to-peak distances P1 from one another. In some embodiments, a first range of peak-to-peak distances P1 may be between about 2 mm to about 4.5 mm, inclusive of all ranges and subranges therebetween. In some embodiments, the second set of annular structures 1110*b* may be disposable at a second peak-to-peak distance P2 or a second range of peak-to-peak distances P2 from one another. In some embodiments, a second range of peak-to-peak distances P2 may be between about 1 mm to about 2.5 mm, inclusive of all ranges and subranges therebetween. In some embodiments, the first peak-to-peak distances P1 may be larger than the second peak-to-peak distances P2. Similarly, the first set of annular structures 1110*a* may have a first width F1 and the second set of annular structures 1110*b* may have a second width F2. In some embodiments, the second width F2 may be smaller than the first width F1. In some embodiments, the first width F1 may be in a range between about 1.75 mm and about 4 mm, inclusive of all ranges and subranges therebetween. In some embodiments, the second width F2 may be in a range between about 1 mm and about 3 mm, inclusive of all ranges and subranges therebetween.

In some embodiments, adjacent annular sections 1110*a*, 1110*b* may have a horizontal spacing S therebetween. In some embodiments, the horizontal spacing S may be in a range between about 0.33 mm to about 1 mm, inclusive of all ranges and subranges therebetween. In some embodiments, the horizontal spacing may be equivalent across the length of the stent 1100. While the horizontal spacing is shown as constant across the length of the stent 1100 in FIG. 9B, it should be appreciated that the horizontal spacing S may be variable along the stent 1100. In some embodiments, the horizontal spacing between the first annular structures 1110*a* may be smaller than the horizontal spacing between the second annular structures 1110*b*. In some embodiments, the first set of annular structures 1110*a* may collectively cause the proximal end portion 1104 of the stent 1100 to have a higher rigidity and/or lower flexibility than the distal end portion 1102.

In some embodiments, the struts 112 may have a width and a thickness (not shown). In some embodiments, the width of the struts may vary across the length of the stent. In some embodiments, the first set of annular members 1110*a* may have struts 1112 including a first W1 width, and the second set of annular members 1110*b* may have struts 1112 including a second width W2 smaller than the first width W1.

FIG. 10 shows a stent 1300 for implantation in a jugular vein including a tapered portion 1306, according to an embodiment. As shown, the stent 1300 includes a distal end portion 1302 having a first diameter D1 and a first length L1 and a proximal end portion 1304 having a second diameter D2 larger than the first diameter and a second length L2 larger than the first length L1. The stent 1300 may further include a central portion configured to taper from the second diameter D2 to the first diameter D1 over a third length L3. In some embodiments, the first third length may be larger than the first length L1 and smaller than the second length L2. In some embodiments, the second length L2 of the proximal end portion 1304 may be sufficiently long to anchor the proximal end portion L2 into a wall of the vessel proximal to the jugular valve. In some embodiments, the second diameter D2 and the second length L2 may be configured to prevent migration of the stent 1300 proximally towards the heart. For example, the second diameter D2 may be larger than a diameter of the jugular valve to prevent migration of the stent 1300 through the jugular valve. In some embodiments, the stent 1300 may have a total length L corresponding to a length of a portion of the IJV of the patient in which the stent 1300 is configured to be implanted. In some embodiments, the total length L may be patient-specific. In some embodiments, the length L may be small, medium, or large depending on the patient's anatomy.

In some embodiments, proximal end portion 1304 may include a first rigidity and the distal end portion 1302 may include a second rigidity smaller than the first rigidity. The second rigidity may be configured to allow the distal end portion 1302 to conform to changes in the geometry of the vessel, thereby preventing nerve compression of nerves near the distal end portion 1304 of the stent 1300. In some embodiments, the first rigidity may be configured to prevent compression of the stent 1300 radially such that the stent maintains the second diameter D2 larger than the diameter of the jugular valve. In some embodiments, the stent 1300 may include any cell pattern described herein such as those described in any of FIGS. 3A-3D, 6A-7D, and/or 9A-9B. In some embodiments, the geometry of the stent 1300 may correspond to a geometry of the IJV of a patient to improve comfort and comfortability during head movements of the patient, while also preventing migration of the stent 1300. Certain aspects of the stent 1300 may be structurally and/or functionally similar to any of the stents described herein, and therefore certain details of the stent 1300 are not described herein with respect to FIG. 10.

Figure 11:
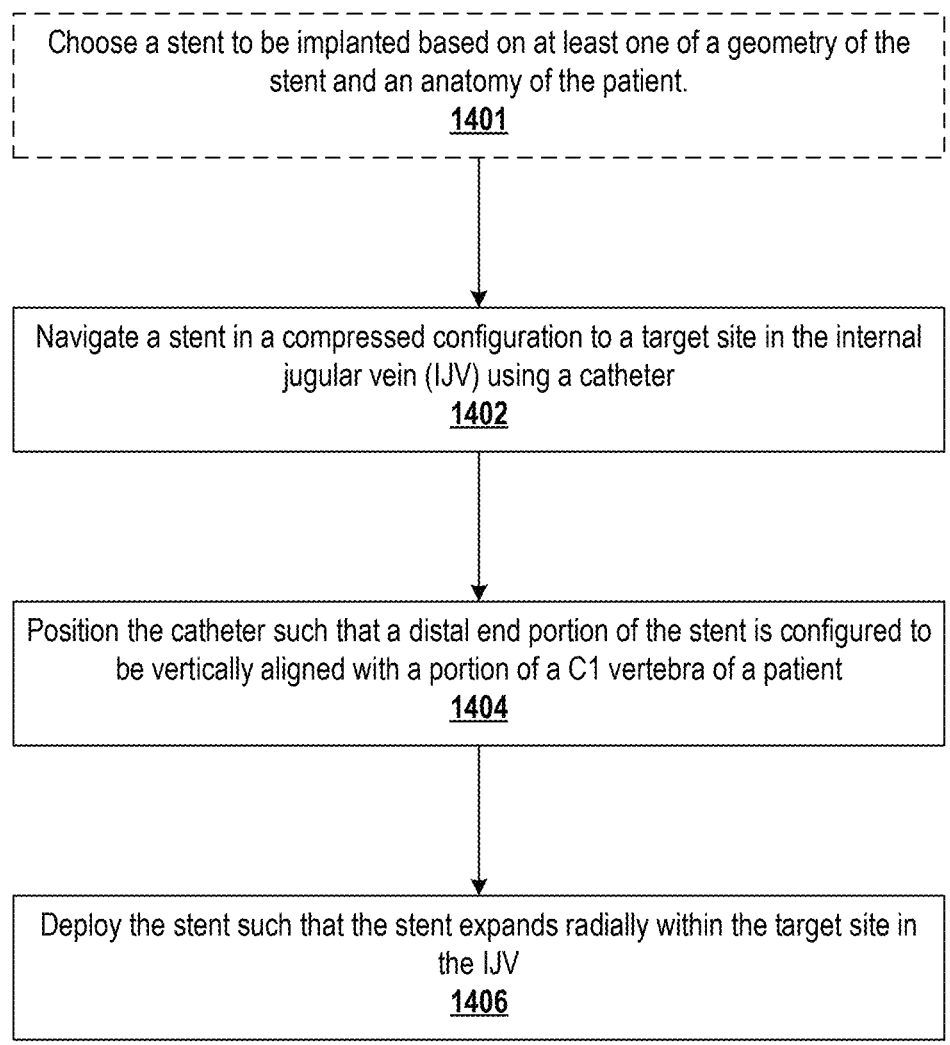
FIG. 11 is a flow chart diagram of an example method of delivering a stent into the IJV, according to an embodiment.

FIG. 11 is an example method of implanting a stent in the IJV of a patient, according to an embodiment. The stent may be structurally and/or functionally similar to any of the stents described herein. In some embodiments, prior to implantation, the method may optionally include choosing a stent to be implanted in the patient. For example, the stent may be chosen based on at least one of a geometry of the stent (e.g., a total length, a taper angle, a maximum diameter, and/or spiral direction) or an anatomy of the patient (e.g., left or right IJV stenosis, length of the IJV, etc.), at 1401. In some embodiments, the user may choose a stent with a specific spiral direction depending on whether the patient needs a stent in the left IJV or the right IJV. In some embodiments, the user may choose a stent with a specific length and/or maximum diameter based on the anatomy of the patient. At 1402, the method includes navigating the stent in a compressed configuration to a target site in the IJV using a catheter. In some embodiments, the stent may be configured to bend in the compressed configuration such that the stent can navigate through the anatomy to the IJV. At 1404, the catheter may be positioned such that a distal end portion of the stent is configured vertically align with a portion of a C1 vertebra of a patient. In some embodiments, the stent may be positioned such that the distal end portion aligns with a portion of the C1, and the proximal end portion is disposed distal to the jugular valve. At 1406, the stent may be deployed such that the stent expands radially within the target site in the IJV. In some embodiments, stent may be configured to expand radially such that the stent is anchored against a wall of the vessel. The stent in the deployed configuration may be configured to have a predetermined flexibility, rigidity, and/or geometry. In some embodiments, the stent in the deployed configuration may be configured to apply a predetermined radial force on the vessel wall. In some embodiments, the radial force may be substantially uniform along the length of the stent. The stent when deployed may be configured to provide a passageway for blood to flow therethrough while accommodating changes in the geometry of the vessel due to head movements of the patient. In some embodiments, the proximal end portion of the stent may be configured to prevent migration of the stent proximally towards the heart.

The introduction of jugular stenting represents a novel approach to addressing a vastly under-recognized clinical need. With the lack of available options for neurointerventionalists, the introduction of a tapered jugular stent with multiple size may alternative approaches to address jugular stent conditions. Physicians currently performing the jugular stenting procedures are using generic stents that they must telescope within one another, as generic stents are not available in sufficient sizes, lengths, and/or shapes that are suitable for the jugular veins anatomy.

The burgeoning understanding of jugular stenosis as a legitimate clinical entity, coupled with the evolving techniques in stent design and deployment, heralds a new era in the diagnosis and management of this condition. With increasing awareness and advancements in stent technology, jugular stenting is poised to become a mainstream intervention, offering hope for improved outcomes and quality of life for patients suffering from this previously overlooked conditions.

It should be understood that the disclosed embodiments are not representative of all claimed embodiments. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

As used in this specification and/or any claims included herein the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

The invention claimed is:

1. A stent, comprising:
an elongate body configured to be disposed in an internal jugular vein (IJV) of a patient, the elongate body configured to transition from a delivery configuration to a deployed configuration when implanted in the IJV, the elongate body defining a lumen configured to allow blood to flow therethrough, the elongate body including:
a distal end portion configured to expand to a first diameter against a first portion of a wall of the IJV and having a first rigidity;
a proximal end portion configured to expand to a second diameter against a second portion of the wall of the IJV and having a second rigidity sufficient to anchor the proximal end portion against the second portion of the wall of the IJV, the second rigidity greater than the first rigidity, the proximal end portion having a length between about 3 centimeters (cm) and about 7 cm; and
a central portion disposed between the proximal end portion and the distal end portion, the central portion tapering from the proximal end portion the distal end portion when the elongate body is in the deployed configuration.

2. The stent of claim 1, wherein the second rigidity is greater than a rigidity of the second portion of the wall of the IJV.

3. The stent of claim 1, wherein the distal end portion having the first rigidity is configured to expand against the first portion of the wall of the IJV closer to a head of the patient, the distal end portion configured to deform according the first portion of the wall of the IJV to prevent compression of one or more nerves near the first portion of the wall of the IJV at a location of the distal end portion.

4. The stent of claim 1, wherein the elongate body has a total length in the deployed configuration such that, when disposed in the IJV, the distal end portion is vertically aligned with a C1 vertebrae of the patient.

5. The stent of claim 1, wherein at least a portion of the stent is configured to bend up to about 40 degrees.

6. The stent of claim 1, wherein the stent is pre-shaped to have a spiral configuration in which the stent has a spiral shape with a pitch of about 5 degrees to about 45 degrees.

7. The stent of claim 6, wherein the stent is configured to be disposed in a right IJV or a left IJV by the spiral shape twisting in a first direction or a second direction, the second direction being opposite the first direction.

8. The stent of claim 1, wherein the stent, when disposed in the IJV, is configured to be torqued to an angle of at least about 5 degrees in at least one of a clockwise or counterclockwise direction.

9. The stent of claim 1, wherein the elongate body includes a plurality of annular structures, each annular structure including a plurality of struts, each annular structure coupled to an adjacent annular structure by one or more connection members, a peak-to-peak distance between adjacent annular structures in the distal end portion is smaller than a peak-to-peak distance between adjacent annular structures in the proximal end portion.

10. The stent of claim 9, wherein a width of the plurality of struts of annular structures in the proximal end portion is greater than a width of the plurality of struts of annular structures in the distal end portion.

11. A stent, comprising:
an elongate body configured to be disposed in an internal jugular vein (IJV) of a patient, the elongate body defining a lumen configured to allow blood to flow therethrough, the elongate body configured to expand from a first configuration to a second configuration, the elongate body when disposed in the IJV and in the second configuration including:
a distal end portion configured to be positioned to be vertically aligned with a portion of a C1 vertebra, the distal end portion having a first length and a first diameter;
a proximal end portion configured to be positioned near a jugular valve of the patient, the proximal end portion having a second length greater than the first length and a second diameter greater than the first diameter, the second length and the second diameter configured to anchor the proximal end portion against a wall of the IJV; and
a central portion disposed between the proximal end portion andthe distal end portion, the central portion tapering from the second diameter the first diameter over a third length when the elongate body is in the second configuration, the second length being greater than the third length up to about 3.5 times a value of the third length.

12. The stent of claim 11, wherein the second diameter is between about 10 mm and about 20 mm.

13. The stent of claim 11, wherein the second diameter is between about 3 mm and about 12 mm.

14. The stent of claim 11, wherein the first length is between about 0.5 cm and about 3 cm, and the second length is between about 4 cm and about 6 cm.

15. The stent of claim 11, wherein the third length is smaller greater than the first length and greater than the second length.

16. The stent of claim 11, wherein the proximal distal end portion has a first rigidity and the distal proximal end portion has a second rigidity lower greater than the first rigidity.

17. The stent of claim 11, wherein at least a portion of the stent is configured to bend up to about 40 degrees.

18. The stent of claim 11, wherein the stent is pre-shaped to have a spiral configuration in which the stent has a spiral shape with a pitch of about 5 degrees to about 45 degrees.

19. The stent of claim 11, wherein the stent, when disposed in the IJV, is configured to be torqued to an angle of at least about 5 degrees in at least one of a clockwise or counterclockwise direction.

20. The stent of claim 11, wherein the third length is between about 2 cm and about 6 cm.

21. A stent, comprising:
an elongate body configured to be implanted in an internal jugular vein (IJV) of a patient, the elongate body defining a lumen configured to allow blood to flow therethrough, the elongate body having a total length between about 5 cm and about 11 cm, the elongate body including:
a distal end portion having a first diameter when the elongate body is in a deployed configuration, the distal end portion including a first set of annular structures and a first set of connection members, each annular structure of the first set of annular structures including a plurality of struts and being coupled to adjacent annular structures by one or more connection members of the first set of connection members, and adjacent annular structures of the first set of annular structures being disposable at a first range of peak-to-peak distances from each other; and a proximal end portion having a second diameter when the elongate body is in the deployed configuration, the proximal end portion having a length between about 3 cm and about 7 cm, the proximal end portion including a second set of annular structures and a second set of connection members, each annular structure of the second set of annular structures including a plurality of struts being coupled to adjacent annular structures by one or more connection members of the second set of connection members, and adjacent annular structures of the second set of annular structures being disposable at a second range of peak-to-peak distances from each other; and a central portion tapering from the second diameter to the first diameter when the elongate body is in the deployed configuration;

wherein an average of the second range of peak-to-peak distances is larger than an average of the first range of peak-to-peak distances, and a width of the plurality of struts of the second set of annular structures is greater than a width of the plurality of struts of the first set of annular structures.

22. The stent of claim 21, wherein the proximal distal end portion has a first length and the length of the proximal end portion is greater than the first length.

23. The stent of claim 21, wherein the distal end portion has a first rigidity and the proximal end portion has a second rigidity greater than the first rigidity.

24. The stent of claim 21, wherein at least a portion of the elongate body is configured be torqued to an angle of at least about 5 degrees in at least one of a clockwise or counterclockwise direction.

25. The stent of claim 21, wherein at least a portion of the elongate body is configured be bent up to about 40 degrees.

26. The stent of claim 21, wherein the stent is pre-shaped to have a spiral configuration in which the stent has a spiral shape with a pitch of about 5 degrees to about 45 degrees.

27. The stent of claim 21, wherein the distal end portion of the elongate body is configured to be aligned with a C1 vertebrae of the patient in the deployed configuration.

* * * * *